(12) United States Patent
Adams

(10) Patent No.: US 6,578,193 B1
(45) Date of Patent: Jun. 10, 2003

(54) ENDIAN-NEUTRAL LOADER FOR INTERPRETIVE ENVIRONMENT

(75) Inventor: Phillip M. Adams, Salt Lake City, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/118,703

(22) Filed: Jul. 17, 1998

Related U.S. Application Data

(60) Provisional application No. 60/079,185, filed on Mar. 23, 1998.

(51) Int. Cl.⁷ .............................. G06F 9/45; G06F 9/44
(52) U.S. Cl. ...................... 717/139; 717/136; 717/118; 717/166
(58) Field of Search .................... 717/5, 138, 136, 717/118, 139, 166; 712/300

(56) References Cited

U.S. PATENT DOCUMENTS

| | | | |
|---|---|---|---|
| 4,277,826 A | 7/1981 | Collins et al. | 364/200 |
| 4,583,166 A | 4/1986 | Hartung et al. | 264/200 |
| 4,811,215 A | 3/1989 | Smith | 364/200 |
| 4,926,322 A | 5/1990 | Stimac et al. | 364/200 |
| 5,023,776 A | 6/1991 | Gregor | 364/200 |
| 5,202,993 A | 4/1993 | Tarsy et al. | 395/700 |
| 5,237,669 A | 8/1993 | Spear et al. | 395/400 |
| 5,274,834 A | 12/1993 | Karach et al. | 395/800 |
| 5,313,231 A * | 5/1994 | Yin et al. | 345/199 |
| 5,325,499 A | 6/1994 | Kummer et al. | 395/425 |
| 5,371,872 A | 12/1994 | Larsen et al. | 395/425 |
| 5,394,547 A | 2/1995 | Correnti et al. | 395/650 |
| 5,414,848 A | 5/1995 | Sandage et al. | 395/650 |
| 5,446,482 A * | 8/1995 | Van Aken et al. | 345/199 |
| 5,471,591 A | 11/1995 | Edmondson et al. | 395/375 |
| 5,517,651 A | 5/1996 | Huck et al. | 395/775 |
| 5,553,305 A | 9/1996 | Gregor et al. | 395/826 |
| 5,555,398 A | 9/1996 | Raman | 395/470 |
| 5,651,136 A | 7/1997 | Denton et al. | 395/445 |
| 5,652,889 A | 7/1997 | Sites | 395/708 |
| 5,754,871 A * | 5/1998 | Wilkerson et al. | 395/800 |
| 5,778,406 A * | 7/1998 | Willard | 711/1 |
| 5,781,792 A | 7/1998 | Asghar et al. | 395/800.35 |
| 5,889,996 A * | 3/1999 | Adams | 395/705 |
| 6,021,275 A * | 2/2000 | Horwat | 395/707 |
| 6,039,765 A * | 3/2000 | Trissel | 703/26 |
| 6,141,732 A * | 10/2000 | Adams | 711/137 |

FOREIGN PATENT DOCUMENTS

| | | | | |
|---|---|---|---|---|
| WO | WO98/06034 | * | 2/1998 | 717/5 |

OTHER PUBLICATIONS

"Endian–Neutral Software Part 1", James R. Gillig, Dr. Dobbs Journal, v19,n11,p62 ISSN 1044–789X, Oct. 1994.*

(List continued on next page.)

Primary Examiner—Tuan Q. Dam
Assistant Examiner—Todd Ingberg
(74) Attorney, Agent, or Firm—Haynes and Boone, LLP

(57) ABSTRACT

A method is disclosed for a endian correction at load time, thereby eliminating the need to perform multiple endian correction routines during execution. The method comprises obtaining a platform endian context corresponding to the processor; obtaining a operand endian context indicating the ordering of operands contained in the set of instructions to be loaded; reading an instruction in the set of instructions; determining whether an operational code for the instruction is endian antithetical to the platform endian context; if the operational code for the instruction is endian antithetical, reversing the endian order of the instruction; loading the instruction into an appropriate memory location; and repeating the above steps as required for each instruction until all of the instructions have been loaded into memory.

16 Claims, 16 Drawing Sheets

OTHER PUBLICATIONS

"Endian–Neutral Software Part 2", James R. Gillig, Dr. Dobbs Journal, v19,n13,p44 ISSN 1044–789X, Nov. 1994.*

"Your Own Endian Engine", John Rodgers, Dr. Dobbs, v20,n11,pp. 30–36 ISSN1044–789X, Nov. 1995.*

"Hewlett–Parckard Works On a Cross Platform Strategy For Its Tools and System Software", Newswire, Jun. 1997.*

"Endian Issues", William Stallings, Byte Articles, "WWW-.byte.com/art/9509/sec12/art1.htm" Sep. 1995.*

"Bit Operations with C Macros", John Rogers, Dr. Dobbs, Nov. 1995.*

"Instruction Cache Block Touch Retro–Fitted onto Microprocessor," IBM Technical Disclosure Bulletin, vol. 38, No. 07 pp. 53–56 (Jul. 1995).

"Dual On–Chip Instruction Cache Organization in High Speed Processors, " IBM Technical Disclosure Bulletin, vol. 37, No. 12, pp. 213–214 (Dec. 1994).

Preemptible Cache Line Prefecth Algorithm and Implementation, IBM Technical Disclosure Bulletin, vol. 33, No. 3B, pp. 371–373 (Aug. 1990).

* cited by examiner

| Typical Byte–Ordering, Run-Time Code for VMI With 4-Byte Address/Operand ||  |
|---|---|---|
| Opcode | Address/Operand | |
| movsx | eax, byte ptr [esi] | 1 |
| xor | ebx, ebx | |
| shl | eax, 8 | |
| mov | bl, [esi + 1] | 2 |
| or | eax, ebx | |
| shl | eax, 8 | |
| mov | bl, [esi + 2] | 3 |
| or | eax, ebx | |
| shl | eax, 8 | |
| mov | bl, [esi + 3] | 4 |
| or | eax, ebx | |

| Typical Byte–Ordering, Run-Time Code for VMI With 2-Byte Address/Operand ||  |
|---|---|---|
| Opcode | Address/Operand | |
| movsx | eax, byte ptr [esi] | 1 |
| xor | ebx, ebx | |
| shl | eax, 8 | |
| mov | bl, [esi + 1] | 2 |
| or | eax, ebx | |

| Typical Endian–Neutral, Run-Time Code | | |
|---|---|---|
| | Opcode | Address/Operand |
| 16 Bit | movsx | eax, word ptr [esi] | ← 276
| 32 Bit | mov | eax, dword ptr [esi] | ← 278

↑ 212   ↑ 214   *Fig. 11*

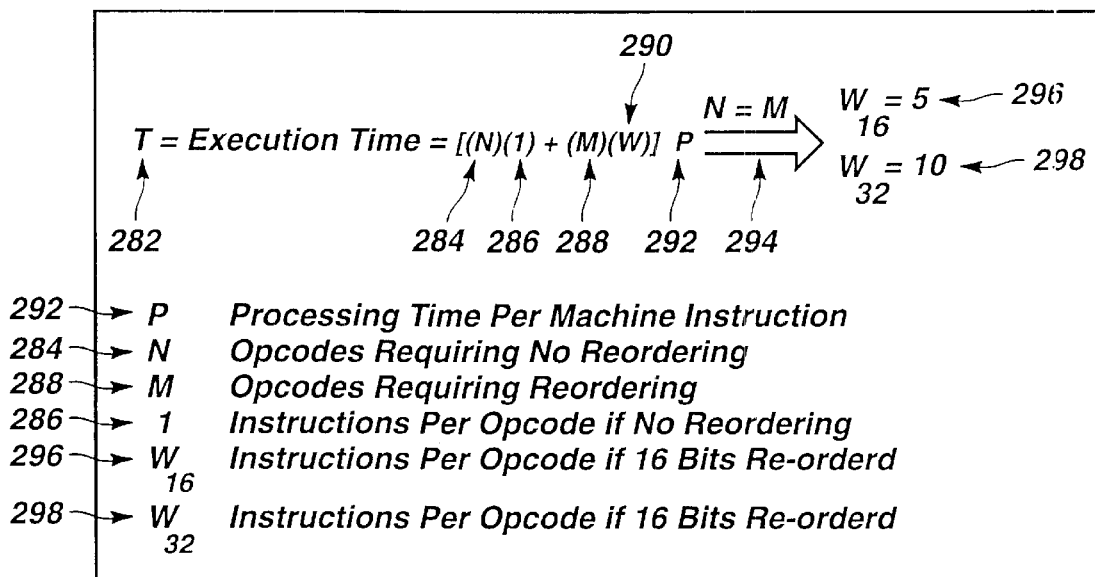

$$T = \text{Execution Time} = [(N)(1) + (M)(W)]\,P \xrightarrow{N=M} \begin{array}{l} W_{16} = 5 \\ W_{32} = 10 \end{array}$$

282    284   286   288   292   294    296 / 298

292 → P    Processing Time Per Machine Instruction
284 → N    Opcodes Requiring No Reordering
288 → M    Opcodes Requiring Reordering
286 → 1    Instructions Per Opcode if No Reordering
296 → $W_{16}$    Instructions Per Opcode if 16 Bits Re-orderd
298 → $W_{32}$    Instructions Per Opcode if 16 Bits Re-orderd

*Fig. 12*

ENDIAN-NEUTRAL LOADER FOR INTERPRETIVE ENVIRONMENT

This appln claims benefit of Prov. No. 60/079,185 filed Mar. 23, 1998.

BACKGROUND

1. The Field of the Invention

The invention relates generally to computers hosting interpreted languages and emulators, and more specifically to accelerators for emulators and interpreters such as JAVA, Visual Basic, and other virtual machine environments executable by processors having access to caches.

2. The Background Art

Interpreters are nothing more than programs that "realize" some abstract machine's behavior. This is accomplished by having the program execute a series of instructions on the host machine that functionally represent the desired results of the specified interpretive instruction. This is a very useful technique if the desired interpretive program is required to execute on a large number of very different host machines, e.g, JAVA applets or Visual Basic programs.

There are, however potential problems with this approach. The most notable one is the lack of performance achieved by the interpretive program. This can be attributed to many factors. One of the most damaging of these factors is the potential mis-match between the byte-ordering of the abstract machine and the host machine.

In other words, if the abstract machine orders bytes from the least significant to the most significant (Little Endian) and the host machine orders bytes from the most significant to the least significant (Big Endian) then it is impossible for the interpreter to execute on the host machine in a monotonically increasing address fashion.

Interpreters are typically designed as a fixed set (number of interpretive instructions or bytecodes) of small interpretive routines. Each routine is designed to perform the function of the specified interpretive instruction (opcode or bytecode.) Associated with these routines is a control loop that has certain responsibilities. First it must fetch the next interpretive instruction (opcode or bytecode) from the loaded interpretive program's code space. This happens to be the interpreter's data space. Next, it will decode the interpretive instruction (opcode or bytecode) and select the interpretive routine that will perform this interpretive instruction's execution. Finally, it will execute the selected interpretive routine.

The above steps of the control loop are repeated until the interpretive program is finished or an error occurs in the program. This control loop should be minimized to achieve optimal performance. However, if the fetch and decode stages of the control loop must continually fetch and decode "out-of-order" bytes from the interpretive instruction stream due to a mis-match in byte ordering; then the overhead of the control loop becomes substantial and can easily be greater than the actual time required to execute the interpretive routine.

Operations executed by a processor of a computer proceed in a synchronization dictated by a system clock. Accordingly one characteristic of a processor is a clock speed. For example, a clock speed may be 33 megahertz, indicating that 33 million cycles per second occur in the controlling clock.

A processor may execute one instruction per clock cycle, less than one instruction per clock cycle, or more than one instruction per clock cycle. Multiple execution units, such as are contained in a Pentium™ processor, may be operated simultaneously. Accordingly, this simultaneous operation of multiple execution units, arithmetic logic units (ALU), may provide more than a single instruction execution during a single clock cycle.

In general, processing proceeds according to a clock's speed. Operations occur only as the clock advances from cycle to cycle. That is, operations occur as the clock cycles. In any computer, any number of processors may exist. Each processor may have its own clock. Thus, an arithmetic logic unit (ALU) may have a clock operating at one speed, while a bus interface unit may operate at another speed. Likewise, a bus itself may have a bus controller that operates at its own clock speed.

Whenever any operation occurs, a request for interaction is made by an element of a computer. Then, a transfer of information, setup of input/output devices, and setup of the state of any interfacing devices, must all occur.

Each controller of any hardware must operate within the speed or at the speed dictated by its clock. Thus, clock speed of a central processing unit does not dictate the speed of any operation of a device not totally controlled by that processor.

These devices must all interface with one another. The slowest speed will limit the performance of all interfacing elements. Moreover, each device must be placed in the state required to comply with a request passed between elements. Any device that requires another device to wait while some higher priority activity occurs, may delay an entire process.

For example, a request for an instruction or data within a hard drive, or even a main, random-access memory, associated with a computer, must negotiate across a main system bus. A central processing unit has a clock operating at one speed. The bus has a controller with a clock that may operate at another speed. The memory device has a memory management unit that may operate at another speed.

Further to the example, a Pentium™ processor having a clock speed of 100 megahertz may be connected to peripheral devices or main memory by an industry standard architecture (ISA) bus. The ISA bus has a specified clock speed of 8 megahertz. Thus, any time the Pentium™ processor operating at 100 megahertz requests data from the memory device, the request passes to the opposite side of the ISA bus. The data may not be processed or delivered at a speed greater than that of the bus at 8 megahertz. Moreover, a bus typically gives low priority to the central processing unit. In order to avoid underruns and overruns, the input/output devices receive priority over the processor. Thus, the 100 megahertz processor may be "put on hold" by the bus while other peripheral devices have their requests filled.

Any time a processor must access any device beyond its own hardware pins, the hardware interface to the computer outside the processor proper, the required task cannot be accomplished within one clock count of the processor. As a practical matter, a task is not usually completed in less than several clock cycles of the processor. Due to other priorities and the speeds of other devices, as well as the need to adjust or obtain the state configurations of interfacing devices, many clock cycles of a processor may occur before a task is completed as required. Thus, extra steps cost much more than may be expected.

BRIEF SUMMARY AND OBJECTS OF THE INVENTION

In view of the foregoing, it is a primary object of the present invention to provide Endian correction at load time rather than at run time for increasing the execution speed of interpretive environments.

It is another object of the invention to provide programmatic control in a loader for testing and correcting endian-antithetical executables to be stored in a code cache.

It is another object of the invention to provide a test and response for all virtual machine instructions forming a virtual machine, in which each of the compiled or assembled, linked, and loaded native code segments implementing a virtual machine instruction is Endian neutral with respect to a host platform, and is ready to be executed by native instructions into which it is decodable readily with no checking or correction of endian orientation.

It is another object of the invention to provide a main memory device containing data structures adaptable to determine and selectively correct endian-dependent, mismatched addresses ready to be executed by a processor, without requiring run-time reordering of bytes in the main memory device upon retrieval of any virtual machine instruction.

Consistent with the foregoing objects, and in accordance with the invention as embodied and broadly described herein, an apparatus and method are disclosed in one embodiment of the present invention as including a central processing unit (CPU) having an operably associated memory and processor cache for storing code to be transmitted.

The foregoing problems are resolved by resolving the mismatch in byte ordering in the interpretive instruction stream during load time. Simply stated, the interpretive instruction stream is recorded, if necessary, to conform with the byte ordering of the host machine. Since the interpretive instruction stream is execute-only (read only) there is no danger in disrupting the byte ordering of the execution.

The technique significantly improves performance of interpretive environments such as JAVA, while executing interpretively in INTEL x86 processors. For example, JAVA's virtual (abstract) machine defines 38 opcodes (bytecodes) that have 16-bit/32-bit operands. JAVA's virtual (abstract) machine includes a WIDE instruction that produces another 12 of these instructions-Totaling 50 instructions. Typical 16-bit run-time code used to resolve byte-ordering mismatch require 5 separate machine instructions. Sample 16-bit run-time employed in accordance with the invention requires a single instruction even with 32-bit addressing.

This indicates that interpretive run-time execution overhead can be reduced to one-fifth for these instructions. Furthermore, these instructions are high-use instructions which have a significant impact on overall execution. These instructions include about a quarter of all instructions, but approximately half of all executions, since these instructions are used almost twice as often as average instructions.

The implementation of the invention requires little or no loading overhead. In the case of JAVA, the classes are already inspected at load time. At this point, the byte ordering is resolved with no additional overhead required.

Much interest has been focused over decades on virtual machines. Nevertheless, the slow performance (compared to native code processing) of virtual machines has largely counter-balanced the platform-independent benefits associated therewith.

However, specific knowledge may exist with respect to a particular environment. To take better advantage of interpreted environments generally, such as virtual machines, an apparatus and method in accordance with the invention may rely on this knowledge of the execution environment for a virtual machine in order to optimize the use of the virtual machine instructions. Knowing in advance that certain instructions will definitely be required, much faster execution speeds may be obtained by preparing operands corresponding to those instructions in proper endian order.

For example, in one embodiment, an apparatus and method in accordance with the invention a loader may test and correct endian-antithetical instructions to provide a full set of virtual machine instructions, properly compiled or assembled, linked, and loaded in memory.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIGS. 9–10 are representations of run-time byte ordering codes illustrating a process executed by the processor to correct antithetical operands; and FIG. 11 illustrates endian-neutral, run-time codes.

FIGS. 12–13 diagrams associated comparative execution times with endian antithetical and endian neutral codes;

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 18, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

Those of ordinary skill in the art will, of course, appreciate that various modifications to the details illustrated in the schematic diagrams of FIGS. 1–18 may easily be made without departing from the essential characteristics of the invention. Thus, the following description is intended only as an example, and simply illustrates one presently preferred embodiment consistent with the invention as claimed herein.

Figure 1:
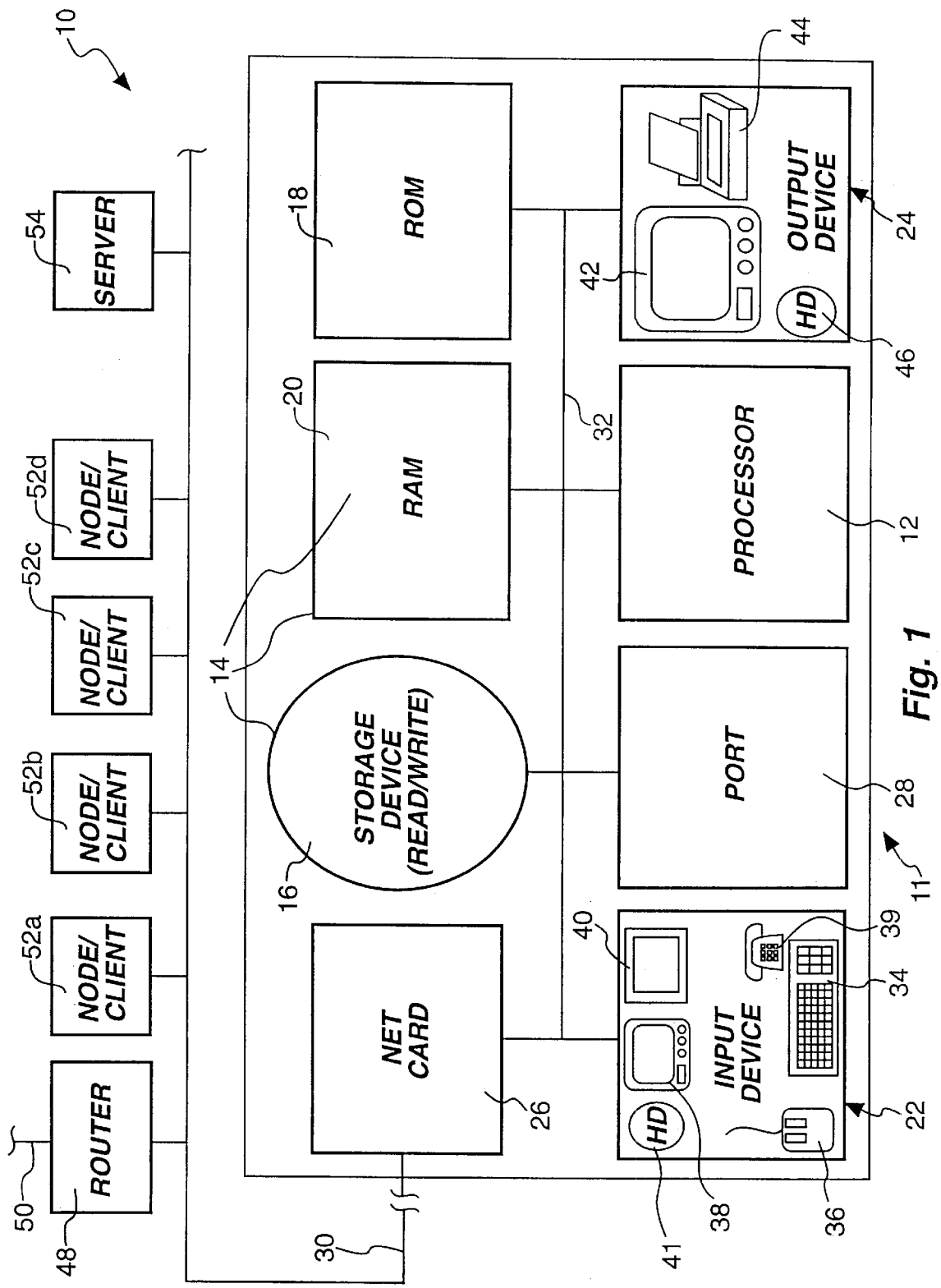
FIG. 1 is a schematic block diagram of an apparatus in accordance with the invention.
Figure 2:
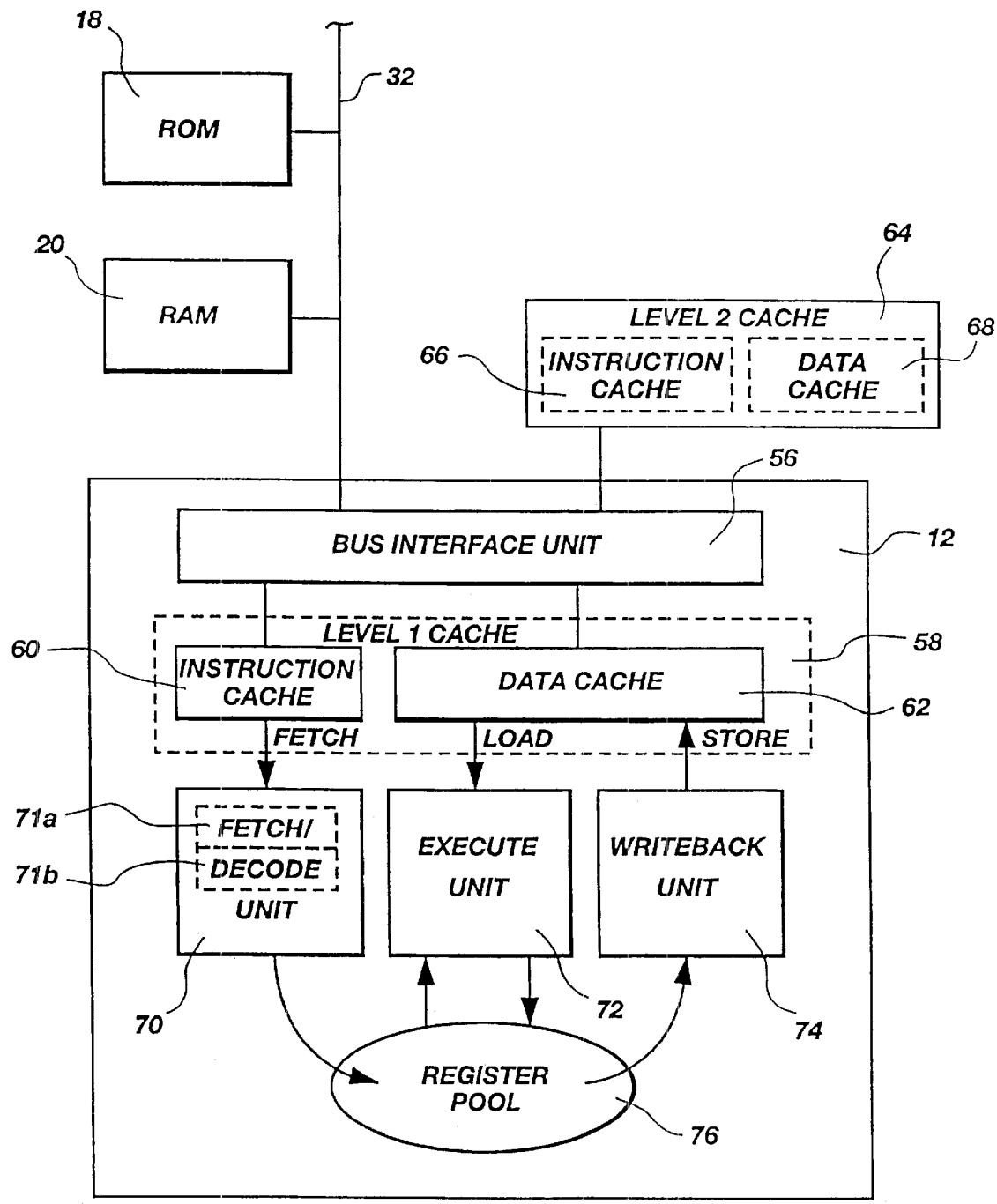
FIG. 2 is a schematic block diagram showing implementation details for one embodiment of the apparatus of FIG. 1.
Figure 3:
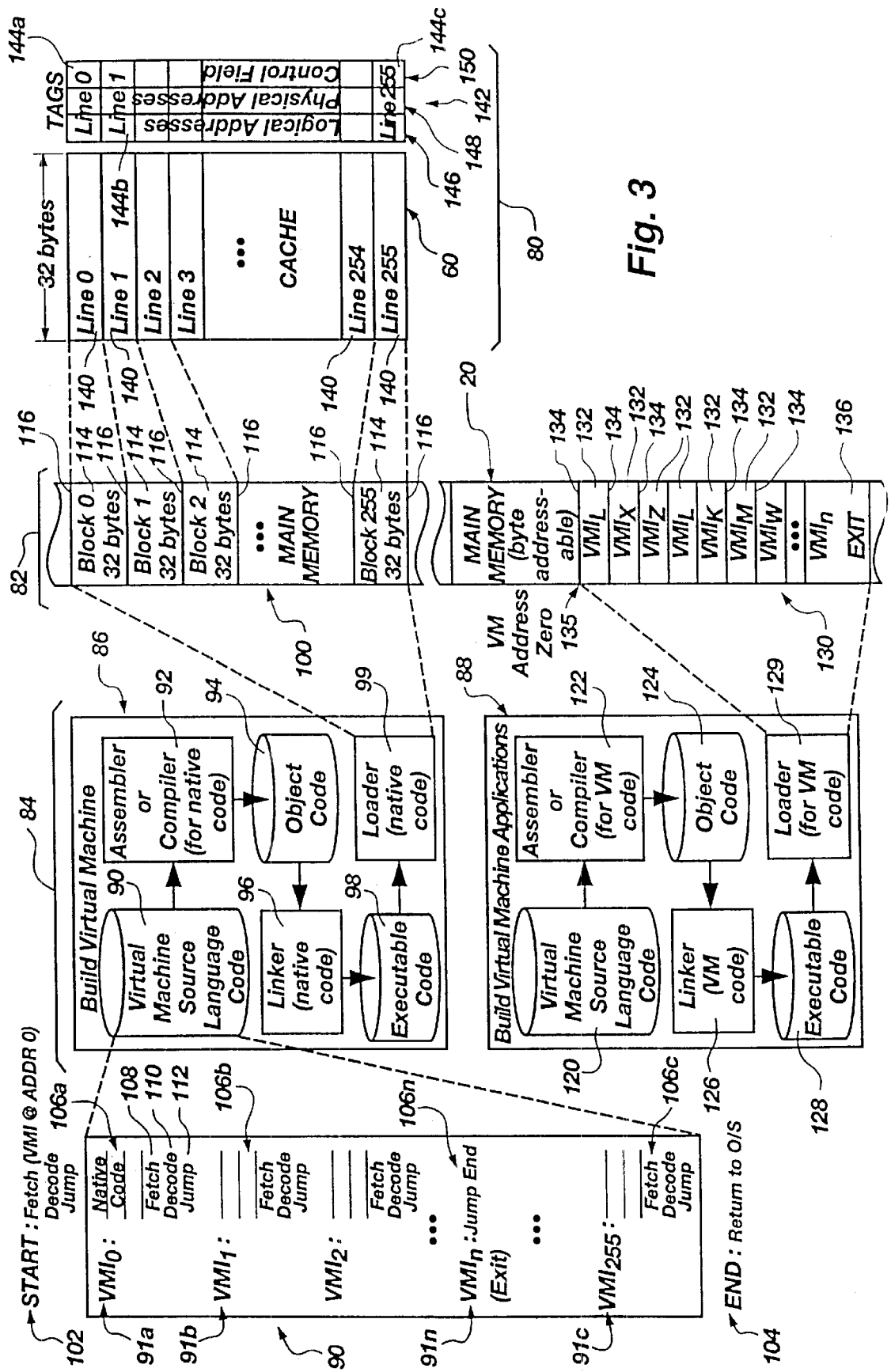
FIG. 3 is a schematic block diagram of executable modules and data structures consistent with one implementation of an apparatus and method in accordance with the invention.

Referring now to FIGS. 1–3, and more particularly, an apparatus 10 may include a node 11 (client 11, computer 11) containing a processor 12 or CPU 12. The CPU 12 may be operably connected to a memory device 14. A memory device 14 may include one or more devices such as a hard drive or non-volatile storage device 16, a read-only memory 18 (ROM) and a random access (and usually volatile) memory 20 (RAM).

The apparatus 10 may include an input device 22 for receiving inputs from a user or another device. Similarly, an output device 24 may be provided within the node 11, or accessible within the apparatus 10. A network card 26 (interface card) or port 28 may be provided for connecting to outside devices, such as the network 30.

Internally, a bus 32 (system bus 32) may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36. A touch screen 38, a telephone 39, or simply a telephone line 39, may be used for communication with other devices, with a user, or the like. Similarly, a scanner 40 may be used to receive graphical inputs which may or may not be translated to other character formats. A hard drive 41 or other memory device 14 may be used as an input device whether resident within the node 11 or some other node 52 (e.g., 52a, 52b, etc.) on the network 30, or from another network 50.

Output devices 24 may likewise include one or more physical hardware units. For example, in general, the port 28 may be used to accept inputs and send outputs from the node 11. Nevertheless, a monitor 42 may provide outputs to a user for feedback during a process, or for assisting two-way communication between the processor 12 and a user. A printer 44 or a hard drive 46 may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 (e.g. 52a, 52b, 52c, 52d) may have various communication capabilities.

In certain embodiments, a minimum of logical capability may be available in any node 52. Note that any of the individual nodes 52a–52d may be referred to, as may all together, as a node 52.

A network 30 may include one or more servers 54. Servers may be used to manage, store, communicate, transfer, access, update, and the like, any number of files for a network 30. Typically, a server 54 may be accessed by all nodes 11, 52 on a network 30. Nevertheless, other special functions, including communications, applications, and the like may be implemented by an individual server 54 or multiple servers 54.

In general, a node 11 may need to communicate over a network 30 with a server 54, a router 48, or nodes 52. Similarly, a node 11 may need to communicate over another network (50) in an internetwork connection with some remote node 52. Likewise, individual components 12–46 may need to communicate data with one another. A communication link may exist, in general, between any pair of devices.

Referring now to FIG. 2, a processor 12 may include several internal elements. Connected to the bus 32, a bus interface unit 56 handles the bus protocols enabling the processor 12 to communicate to other devices over the bus 32. For example, the instructions or data received from a ROM 18 or data read from or written to the RAM 20 may pass through the bus interface unit 56.

In some processors, a processor cache (e.g. cache 58,64), such as a level-1 cache 58 may be integrated into the processor 12. In specific embodiments of processors 12, such as the Pentium™ and Pentium™ Pro processors, as well as the PowerPC™ by Motorola, the level-1 cache 58 may be optionally subdivided into an instruction cache 60 and a data cache 62.

A level-1 cache 58 is not required in a processor 12. Moreover, segregation of the instruction cache 60 from the data cache 62 is not required. However, a level-1 cache 58 provides rapid access to instructions and data without resort to the main memory 18, 20 (RAM 20). Thus, the processor 12 need not access (cross) the bus interface unit 56 to obtain cached instructions and data.

Certain processors 12 maintain an external cache 64. The external cache 64 is identified as a level-2 cache in FIG. 2. Nevertheless, the level-2 cache 64 may be a level-1 cache if no level-1 cache 58 is present on the processor 12 directly. Similarly, the external cache 64 may or may not be segregated between an instruction cache 66 and a data cache 68. Any suitable processor cache may be used.

Execution, normally associated with a processor 12, is actually most closely related to a fetch/decode unit 70, an execute unit 72, and a writeback unit 74. Likewise, associated with each cache 58, 64, is typically an inherent, integrated, hardware controller. The cache controller may be thought of as control logic built into the cache hardware.

When the fetch unit 71a issues a request for an instruction, the request goes to the bus interface unit 56. The level-1 cache 58 makes a determination whether or not the request can be satisfied by data or instructions identified with the logical address requested from cached data and instructions.

If an instruction cannot be provided by the level-1 cache 58, the level-2 cache 64 may respond to the request. If the desired item (data or instruction) is not present in either the level-1 cache 58 or the level-2 cache 64, then the main memory 18, 20 may respond with the desired item. Once the request has been fulfilled by the fastest unit 58, 64, 20, 18 to respond with the desired item, the request is completed, and no other devices will respond.

Main memory may include the ROM 18, the RAM 20, or both. Nevertheless, many computers boot up using the contents of the ROM 18 and thereafter use the RAM 20 for temporary storage of data associated with applications and the operating system. Whenever "main memory" is mentioned, it is contemplated that it may include any combination of the ROM 18 and RAM 20.

Once an instruction is retrieved for the fetch unit 71*a*, the instruction is passed to the decode unit 71*b*. The fetch 71*a* and decode 71*b* are typically highly integrated, and perform in an overlapped fashion. Accordingly, a fetch/decode unit 70 is typical.

As a practical matter, the decode unit 71*b* may identify a current instruction to be executed. Identification may involve identification of what type of instruction, what type of addressing, what registers will be involved, and the like. The presence of the instruction in an instruction register, may itself stimulate execution on the next clock count.

Once identification of an instruction is completed by the decode unit 71*b*, an execute unit 72 may immediately process the instruction through low-level, control-loop hardware. For example, sequencers, registers, and arithmetic logic units may be included in an execute unit 72.

Each instruction as it is fetched, decoded, executed, and the like, may require interaction between an individual processing unit 70, 72, 74 and a register pool 76. The registers 76 (register pool 76) are hidden from programmers and applications. Nevertheless, the hardware architecture of the processor 12 provides a hardware logic governing interaction between the units 70, 72, 74 and between the registers 76 and the units, 70, 72, 74.

Upon completion of execution of an instruction, a writeback unit 74 may provide an output. Accordingly, the output may be passed to the bus interface unit 56 to be stored as appropriate. As a practical matter, a result may be stored in a cache 58 of a level-1 variety or in a level-2 cache 64. In either event, a writeback unit 74 will typically write through to the main memory 18, 20 an image of the result.

Modern processors 12, particularly the Pentium™ processors, use a technique called pipelining. Pipelining passes an instruction through each of the fetch/decode/execute steps undergone by that instruction as quickly as possible. An individual instruction is not passed completely through all of its processing steps before the next instruction in order is begun.

For example, a first instruction may be fetched, and on the next clock count another instruction may be fetched while the first instruction is being decoded. Thus, a certain parallel, although slightly offset in time, processing occurs for instructions.

An advantage of a method and apparatus in accordance with the invention is that instructions may be more effectively pipelined. That is, prediction routines have been built into hardware in the Pentium™ class of processors 12. However, prediction is problematic. Inasmuch as a branch may occur, within approximately every five machine code instructions on average, the pipeline of instructions will be in error periodically. Depending on the sophistication of a prediction methodology, one or more instructions in a pipeline may be flushed after entering a pipeline at the fetch unit 71*a*.

Referring now to FIG. 3, a virtual machine 90 or an instruction set 90 implementing a virtual machine 90 on a processor 12 is illustrated schematically. Relationships are illustrated for caching 80 or a cache system 80 for storing loaded and executable instructions 106 (e.g. 106*a*) corresponding to virtual machine instructions 91 (e.g. 91*a*) of a virtual machine 90 or virtual machine instruction set 90.

A virtual machine 90 may be built upon any available programming environment. Such virtual machines 90 may sometimes be referred to as interpreters, or interpreted systems. Alternatively, virtual machines 90 are sometimes referred to as emulators, wherein a set of instructions 91*a–n* may be hosted on a processor 12 of one type to mimic or emulate the functional characteristics of a processor 12 in a hardware device of any other type.

An application may be written to run on or in an environment created for a first hardware device. After the application is fully developed and operational, the application may then be "ported" to another machine. Porting may simply include writing a virtual machine 90 for the second hardware platform. Alternatively, an application may be developed in the native language of a first machine, and a single set 90 of virtual machine instructions 91*a–n* may be created to emulate the first machine on a second machine. A virtual machine 90 is sometimes referred to as an emulation layer. Thus, an emulation layer or virtual machine 90 may provide an environment so that an application may be platform-independent. A JAVA interpreter, for example, performs such a function.

An executable 82 loaded into main memory 18, 20 contains the original images of the contents of the cache system 80. A building system 84 that may be thought of as an apparatus, modules running on an apparatus, or a system of steps to be performed by an apparatus, is responsible to build contents to be loaded into the executable 82.

A builder 86 may be tasked with building and loading an executable image 100 of a virtual machine 90. Similarly, a builder 88 may build an executable image 130 of the instructions 106 implementing an application written in the virtual machine instructions 91 constituting the virtual machine 90. In general, the executable 130 or executable image 130 may represent any application ready to be executed by the execute unit 72 of the processor 12. One embodiment of an executable 130 or an image 130 may be an application written specifically to prompt a high speed loading as described with respect to FIG. 4 below.

A virtual machine 90 or a set 90 of virtual machine instructions 91*a–n* may contain an individual instruction (e.g. 91*a*, 91*b*, 91*n*) corresponding to each specific, unique function that must be accommodated by the virtual machine 90. The virtual machine instruction 91*n*, for example, provides the ability to terminate execution.

In FIG. 3, the builder 86 may include source code 90, virtual machine source code 90. The source code 90 may be assembled or compiled by an assembler 92 or compiler 92, as appropriate. The virtual machine may operate adequately, whether dependent on assembly or compilation. The assembler 92 or compiler 92 operates for native code. Native code, may be thought of as code executable directly on a processor 12 in the apparatus 10.

By native code is indicated the processor-specific instructions 91 that may be executed directly by a processor 12. By directly is not necessarily meant that the native code is always written in binary ones and zeros. Native code 106 may be written in a language to be assembled 92 or compiled 92 into object code 94 and to be eventually linked 96 into an executable 100 loaded for execution. Executables 100 may then be loaded 99 into a memory device 20, 18 for ready execution on or by an execute unit 72 of a processor 12. An executable 100 stored in a non-volatile storage device 16 may sometimes be referred to as an executable file. Once properly loaded 99 into the main memory 18, 20 associated with a processor 12 an executable 100 may be executed by a processor 12.

The assembler 92 or compiler 92 provides object code 94 in native code instructions. The object code 94 may be linked to library routines or the like by a linker 96. The linker 96 may provide all other supporting instructions necessary to run the object code 94. Thus, the linker 96 provides, as output, executable code 98. As a practical matter, the executable code 98 will be run directly from main memory 18, 20 as a loaded executable 100. Thus, a loader 99 may load the executable code 98 into main memory 18, 20 as the loaded code 100.

Code segments 106a–n are written in native code. When any code segment 106a–n (e.g. 106a, 106b, 106c, 106n) is executed, the result is the desired output from the corresponding virtual machine instruction 91a–n (e.g. 91a, 91b, 91c, 91n, respectively). Virtual machine instructions 91a–n identify every available function that may be performed by the virtual machine 90. The instructions 106a–n illustrate segments 106a–n, implementations in native code, executably the hardware, processor 12, that must produce the result associated with each individual virtual machine instruction 91a–n.

Each of the code segments 106a–n contains a FETCH instruction 108 DECODE instruction 110 and JUMP instruction 112. The instructions 108–112 promote pipelining. Thus, the subject of each of the respective instructions decode 110, fetch 108, and JUMP 112 correspond to the very next instruction, the second next instruction, and the third next instruction, respectively, following an instruction 91a–n being executed and corresponding to a code segment 106a–n in question.

A virtual machine instruction set 90 should include a HALT instruction 91n. Thus, a virtual machine instruction 91n within the virtual machine 90 will contain a segment 106n of native code indicating to the processor 12 the fetching and decoding process for instructions used in all applications. The last virtual machine instruction 91a–n contained within a loaded application 130 is a HALT instruction 91n (106n).

In FIG. 3, the loaded executable 100 may be stored in a block 114 separated by block boundaries 116. In the Pentium™ class of processors, each block 114 contains 32 bytes of data. The instruction set 90 or virtual machine 90 contains no more than 256 virtual machine instructions 91a–n. Accordingly, the code segments 106a–n, when compiled, linked, and loaded, may each be loaded by the loader 99 to begin at a block boundary 116, in one currently preferred embodiment. Thus, the number of blocks 114 and the size of each block 114 may be configured to correspond to a cache line 140 in the cache 60. Thus, an image of a code segment 106a–n, compiled, linked, and loaded for each virtual machine instruction 91a–n, exists in a single cache line 140. Likewise, every such virtual machine instruction 91a–n and its native code segment 106a–n has an addressable, tagged, cache line 140 available in the 256 cache lines.

In addition to the builder 86, a builder 88 may build any virtual machine application 120. In FIG. 3, the process of building an application 120 is illustrated. For example, a mock application may be constructed for the exclusive purposes of high-speed loading of the code segments 106 into the cache lines 140. In the embodiment shown, virtual machine source language code 120 or source code 120 may be written to contain instructions 91 arranged in any particular order. In general, instructions 91 are used by a programmer in any suitable order to provide and execute an application 120.

In an embodiment of an apparatus and method in accordance with the invention, the source code 120 may simply contain each of the virtual machine instructions 91 in the virtual machine language. The source code 120 may be assembled or compiled by an assembler 122 or compiler 122 depending on whether the language is an assembled or a compiled language. The assembler 122 or compiler 122 generates (emits, outputs) virtual machine code. The output of the assembler 122 or compiler 122 is object code 124. The object code 124 may be linked by a linker 126 to produce an executable code 128. The executable code 128 may be loaded by a loader 129 into main memory 18, 20 as the loaded executable 130.

The loaded executable 130 is still in virtual machine code. Thus, an application developed in the virtual machine language must be run on a virtual machine. The virtual machine 90 is stored in the cache 60. The cache 60 may actually be thought of as any processor cache, but the closest cache to a processor 12, is capable of the fastest performance.

The loaded executable 130 is comprised of assembled or compiled, linked, and loaded, virtual machine instructions 132. A main memory device 20 is byte addressable. Each of the virtual machine instructions 132 begins at an address 134. Thus, each virtual machine instruction 132 may be of any suitable length required. Nevertheless, a virtual machine address zero 135 may be identified by a pointer as the zero position in the virtual machine 130. Each subsequent address 134 may thus be identified as an offset from the virtual machine zero 135. A last instruction 136 should be effective to provide an exit from the loaded executable 130. Typically, loaded executables 130 are executed in the order they are stored in the memory device 20.

The cache 60 has associated therewith a tag table 142. For each cache line 140, an appropriate tag line 144 exists (e.g. 144a, 144b, 144c). Associated with each tag line 144, is a logical address 146 corresponding to the address 134 of the cache line 140 in question. Likewise, a physical address 148 in a tag line 144 corresponds to an address 116 or block boundary 116 at which the code 114 is stored in the main memory 18, 20. A control field 144c may contain symbols or parameters identifying access rights, and the like for each cache line 140.

Thus, in general, a loaded executable 130 (application 130) has a logical address 134 associated with each virtual machine instruction 132. The logical address 134 associated with the beginning of an instruction 132 is bound by the tag table 142 to the physical address 116 associated with the executable code 100 associated with the corresponding code segment 106 whose compiled, linked, and loaded image is stored at the respective cache line 140 associated with the tag line 144 binding the logical address 134, 146 to the physical address 116, 148.

In one currently preferred embodiment of an apparatus and method in accordance with the invention, the virtual machine instruction set 100 is written so that each block 114 contains a single instruction 91. Moreover, the instruction set 90 is written to occupy exactly the number of cache lines 140 available in the cache 60.

In certain embodiments, an individual instruction 91 may occupy more than a single cache line 140. For example, some caches may have a 16 byte line length. Thus, a 32 byte length for an instruction 91 may require two cache lines 140. In one presently preferred embodiment, a number of cache lines 140 may correspond exactly to the number of blocks 114 required to hold all of the instructions 91, such that each instruction 91 may be addressed by referring to a unique cache line 140.

The cache 60 may be pinned or fenced, and yet continue to operate normally, otherwise. Thus, the controller of the cache 60 will continue to refer to the tag table 142 to determine whether or not an address 146, 148 requested is present. In the case of a virtual machine 90, every instruction 91 may be present in the cache 60. Thus, the tag table 142 will contain the code 106 associated with any address 146, 148 representing any virtual machine instruction 91.

Less than a full set of instructions 91 may be loaded into a cache 60. Alternatively, for a cache 60 having more cache lines 140 than needed for storing a virtual machine 90 in its entirety, unused cache lines 140 may be devoted to other code, loaded in a similar way. Code may be selected according to recency of use, cost/benefit analysis of use, or cost/benefit analysis of retrieval from main memory 18, 20.

The cache 60 is used by way of example. The virtual machine 90 will operate fastest by using the cache 60 closest to the fetch/decode unit 70. Alternatively, another cache 64 may be used. Thus, everything describing the cache 60 may be applied to the cache 66 or the cache 64 so far as loading and pinning of the cache 60 are concerned.

Figure 4:
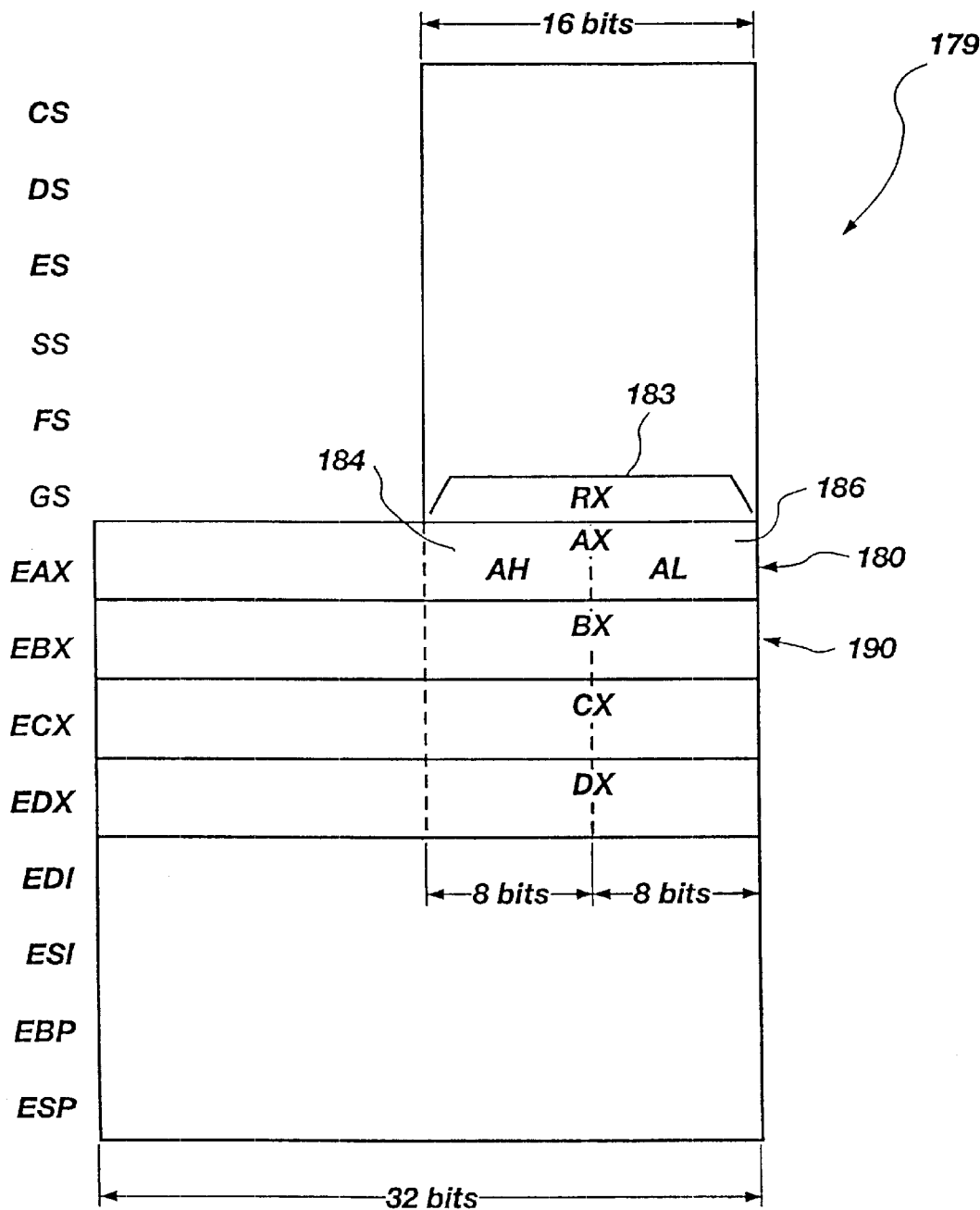
FIG. 4 is a schematic block diagram of registers used for addressing.

Referring to FIG. 4, an efficient fetch/decode/JUMP algorithm may begin with an XOR of the contents of a register EAX 180 against itself. The effect of the XOR is to zero out the contents of the EAX register 180. The contents of register EAX 180 may represent a pointer. Following this clearing operation, a MOVE instruction (MOV) may move the contents of a memory location corresponding to a pointer (next logical instruction number) and identified by the label or logical instruction number stored in a register EBX 190 into the register AL 186.

The register AL 186 is the lower eight bits of the AX register 182. The AX register 182 is the lower 16 bits of a 32 bit EAX register 180. The upper eight bits of the AX register 182 constitute the AH register 184. The AL 186 or lower register 186 thus receives the contents of a memory location corresponding to a current instruction 91 being pointed at by the contents of the EBX 190 register.

Following the MOVE instruction, a SHIFT instruction may shift left by five bits (effectively a multiplication by a value of 32) the contents of the EAX register 180. Since the EAX register 180 was zeroed out, and only the AL register was filled, a shift left of the EAX register 186 multiplies its value by 32. This shift left is effectively a decoding of the instruction that was fetched by the MOVE instruction.

Continuing with the procedure, a JUMP instruction may be implemented to position EAX in the set of virtual machine instructions. Note that each virtual machine instruction 91 in the complete set 90, when loaded, is written within the same number of bytes (32 bytes for the native code segment implementing the virtual machine instruction). The code segment 106 for each instruction 91 begins at a block boundary 116 and at the beginning of a cache line 140. Thus, a virtual machine instruction number multiplied by 32 will step through each of the native code segments 106. Thus, a JUMP to EAX constitutes a direct addressing of the native code segment 106 required to implement a particular virtual machine instruction 91.

Other mechanisms exist to address memory 20. For example, vector tables are commonly used. However, such mechanisms require certain calculations to occur in order to execute a JUMP. Moreover, memory access is required in order to complete the determination of a value in a vector table. Thus, the processor 12 must request access to the main memory 18, 20 in order to fulfill the request for a vector table entry. Accessing main memory 20 and other operations requiring requests to be managed by the bus 32 may increase access times by more than orders of magnitude. The simple arithmetic logic unit operation of a JUMP in the preferred embodiment, is much more efficient than the vector table approach that imposes a memory reference on top of a simple JUMP operation.

Figure 5:
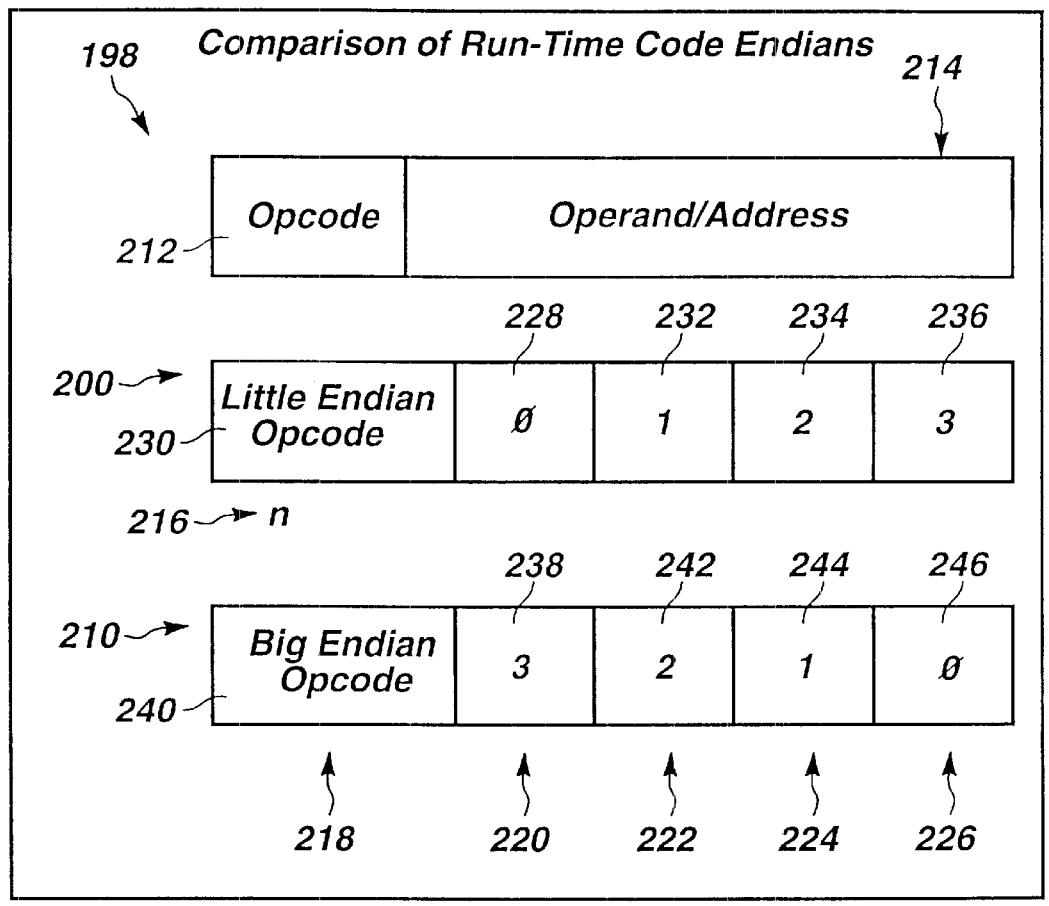
FIG. 5 is a schematic block diagram of run-time code endians.

Referring to FIG. 5, a comparison of run-time code instructions 198, alternative endians 198, is illustrated. In the illustration, a little endian 200 compares with a big endian 210.

In general, run-time code 100 typically contains an opcode 212 or bytecode 212 effective to be executed as an interpreter instruction 91 by the execute unit 72 in the processor 12. The opcode 212 is the instruction to be interpreted by the virtual machine 90, to be processed by the execute unit 72, and is sometimes referred to as the executable 212 in a processing instruction 198.

Associated with an opcode 212 may be an operand 214. Opcodes 212 may operate without any operational data 214 or operands 214. However, in any language, several of the opcodes 212 available will permit or require addresses 214 as operands 214. The address 214 points to a location for finding the data that the opcode 212 will operate on.

Typically, an opcode 212 is contained within a single byte 218 of code. The byte order 216 or the byte or byte numbers 216 may be arranged in either a little endian 200 or big endian 210 format. In the byte ordering 216, an $n^{th}$ byte 218 contains the opcode 212. The $n+1^{st}$ byte 220 follows the opcode 212 (e.g. opcode 230 in a little endian 200). Thereafter, subsequent bytes 222, 224, 226, are arranged in order of significance (ascending for a little endian 200, descending for a big endian 210).

Each operand 214 or address 214 need not contain the entire four bytes 220, 226. Addresses 214 may be 16-bit or 32-bit in Pentium processors 12. In a little endian 200, the n+1byte 220 is the least significant byte 228. The $n+2^{nd}$ byte 222 is the next and more significant, byte 232. Likewise, the $n+3^{rd}$ byte 224 is the next and more significant, byte 234. Finally, the last byte 226 or $n+4^{th}$ byte 226 is the most significant byte 236.

The address 214 of a little endian 200 or big endian 210 may be a 16-bit, and thus, 2 bytes, or 32-bits and 4 bytes 220. Thus, a little endian 200 contains an opcode 230 followed by the address 214 with all bytes 228–236 arranged in ascending order from the least significant byte 228 to the most significant byte 236.

A big endian 210 contains a leading opcode 240 also. However, in a big endian 210, the most significant byte 238 is arranged as the first address byte 220, or the $n+1^{st}$ byte 220 in the address 214. Likewise, the next most significant byte 242 is arranged as the $n+2^{nd}$ byte 222. The following byte 224 or $n+3^{rd}$ byte 224 is the next most significant byte 244 in descending order. Finally, the least significant byte 246 occupies the $n+4^{th}$ byte 226 of the address 214.

Thus, the processor 12 will read a little endian 200 to interpret the last byte 226 in a 32-bit address 214 as the most significant byte 236. The first byte 220 will be read as the least significant byte 228. By contrast, the processor 12 operating on a big endian 240 will interpret the first byte 220 after the opcode 218 as containing the most significant byte 238, with the least significant bye 246 following in the last byte location 226 for a 32-bit address 214, and following immediately in the next byte 222 after the first byte 220 in a 16-bit address 214.

Figure 6:
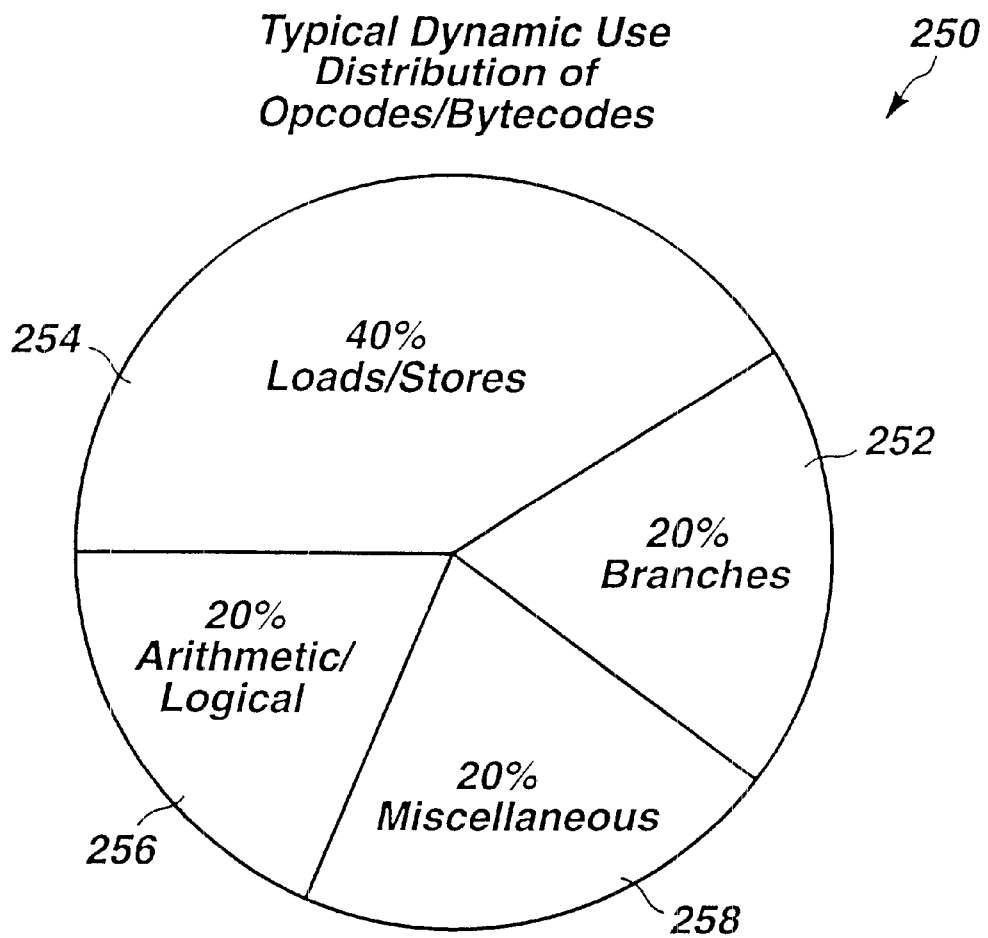
FIGS. 6–7, are schematic block diagrams comparing respective shares are occupied by dynamic opcodes during execution by the processor of FIG. 1.

Referring to FIG. 6, the typical dynamic use of opcodes 212 is illustrated according to the distribution of such use within a processor 12. The dynamic use distribution 250 involves different instructions 198, each of which may be called multiple times. As with any physical machine, a computer program 130 does not use each component part or instruction 198 the same number of times. Thus, although, for example, endian-dependent instructions 198 provide about 25 percent of all individual instructions 91, certain lines 114 may be used more often than others. Accordingly, it is useful to discuss the dynamic use distribution 250 of the instructions 198.

The dynamic use 250 includes a proportion of branches 252 or branching functions 252. Typical branching functions 252 may include IF commands, GOTO commands and the like. Branches account for approximately 20 percent of all instructions 106 associated with programmed instructions 132 actually executed in a program 130.

Loads and stores 254 account for approximately 40 percent of all executions 106 for instructions 132. For example a PUT, PUSH, GET, or the like constitutes an instruction 106 in the class of loads and stores 254. Approximately 40 percent of all instructions 106 involve loads and stores 254.

Arithmetical and logical operations 256 provide approximately 20 percent of all executed instructions 106, thus typical operations of multiplication, subtraction, division, logical comparisons and so forth, and Boolean algebra, are included in the arithmetical and logical operations 256. Arithmetical and logical operations 256 are endian independent. Miscellaneous operations 258 make up the remainder of the dynamic use distribution 250 of instructions 132 in a program 130.

Approximately 10 to 15 percent of the miscellaneous instructions 258 are endian-dependent. That is, endian-independent instructions 106, 198 will not contain addresses 214 that depend on whether they are little endians 200 or big endians 210. Thus, the arithmetical and logical operations 256 are endian-independent, while approximately 10 to 15 percent of the miscellaneous instructions 258 or miscellaneous executions 258 of instructions 132 are endian-independent.

All the branches 252 are endian-dependent. Of the loads and stores 254, perhaps a quarter or 25 percent will be affected by the endians 200, 210. Thus, endian-specific or endian-dependent loads and stores 254 will constitute about 10 percent of all dynamic use 250 of instructions 132.

The significance of the orientation of endians 200, 210 is the actual processing effect in the execute unit 72 and the fetch/decode unit 70 in the processor 12. In a processor 12 that is designed to interpret instructions 198 as little endians 200, a little endian 200 is executed directly, with no manipulation of the bytes 228–236. By contrast, a processor 12 designed to interpret an instruction 198 as a little endian 200, a big endian 210 must be arranged to place the least significant byte 246 at the first byte position 220, the most significant byte 238 in the last byte position 226, and so forth.

The manipulation of the bytes 238–246 among the byte locations 220–226, occupies a certain number of machine level instructions 106 in each virtual machine instruction 91. As a practical matter, in a 16-bit machine, an instruction 198 requiring rearrangement between a little endian 200 and big endian 210 format or between a big endian 210 and a little endian format 200 may occupy 5 times as many machine level instructions 106. A 32-bit instruction 198, when requiring re-ordering between a little endian format 200 and a big endian format 210, or between a big endian format 210 and a little endian format 200, may occupy ten times as many machine level instructions 106.

Thus, the branches 252 occupy a disproportionate share of the time of the processor 12. Similarly, that portion of the loads and stores 254 that are endian-specific, or endian-dependent require a disproportionate share of processing time on the processor 12. Likewise, the fraction of the miscellaneous instructions 258 that are endian-specific, and thus endian-dependent as to their processing time, it will occupy a disproportionate share of the processing time.

As a practical matter, the actual distribution of static code 106 or instructions 91 in a virtual machine 90 may be compared with the actual dynamic use distribution 250 of those individual instructions 91 invoked by the program instruction 132 illustrating the great disparity in processing time in the processor 12. Thus, the individual fractions 252, 254, 256, 258 are not representative of the occupation of the processor 12. Approximately 30 percent of all dynamic use distribution 250 will be endian-dependent instructions 198.

Figure 7:
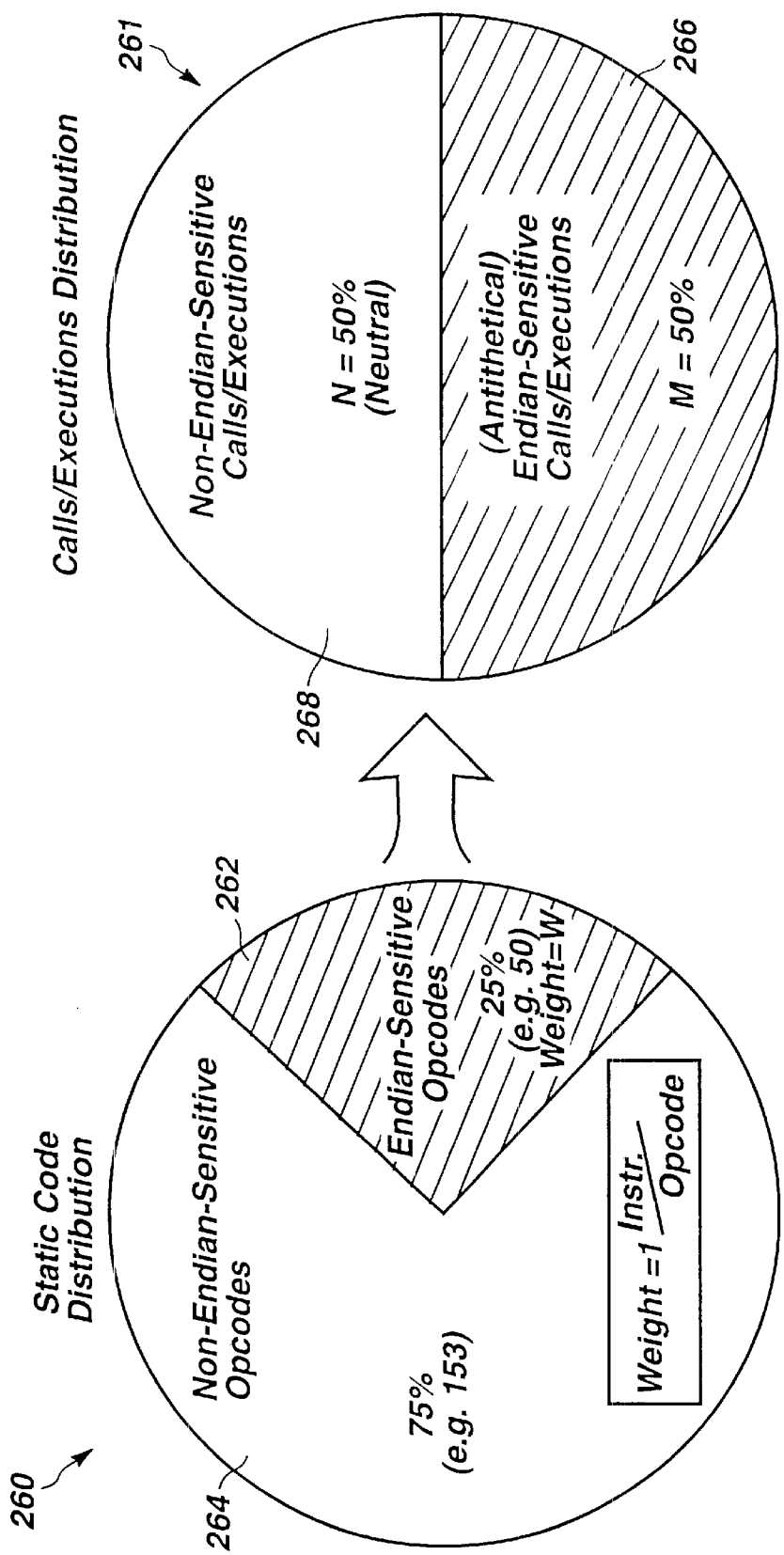

Referring to FIG. 7, a static code distribution 260 illustrates the proportion of all the instructions 250 that are endian-sensitive 262. The endian-sensitive opcodes 262 or endian-specific opcodes 262 occur approximately 25 percent of the time in an instruction set 90 of a virtual machine. By contrast, the non-endian sensitive opcodes 264 occur approximately 75 percent of the time in a machine language, but maybe half the codes executed in a virtual machine 90. Note that the static code distribution 260 does not reflect the number of times that a particular opcode 218 will actually be called. Certain instructions 191, 198 are called more often for instructions 106, or as a result of instructions 132 in a program 130 invoking interpretive instructions 91.

The call distribution 261 or execution distribution 261 is illustrated in FIG. 7. One may note that the endian-sensitive calls 266 or endian-specific calls 266, also referred as endian-sensitive executions 266 or endian-antithetical executions 266, are called approximately half the time in a program 130. Note that endian orientation is not an issue for a processor 12 receiving an instruction 132 configured with an endian 198 consistent with the expectations of the processor 12. The issue of little endian 200 and big endian 210 processing in a processor 12 is the presence of antithetical endians 266 operating in a processor 12.

For example, each of the virtual machine instructions 91 in native code 106 must operate 5 or 10 times longer, or execute 5 or 10 time more processing steps 106 in order to re-order the improper endian 198. Thus, the antithetical executions 266 identify those situations in which the bytes 228–336 or bytes 238–246 must be rearranged following the respective opcodes 230, 240, respectively. Non-endian-sensitive calls 261 or executions 261 are considered to be endian-neutral 268. As a practical, approximately half of all executions 261 are endian-neutral 268 and half are endian antithetical 266.

Figure 8:
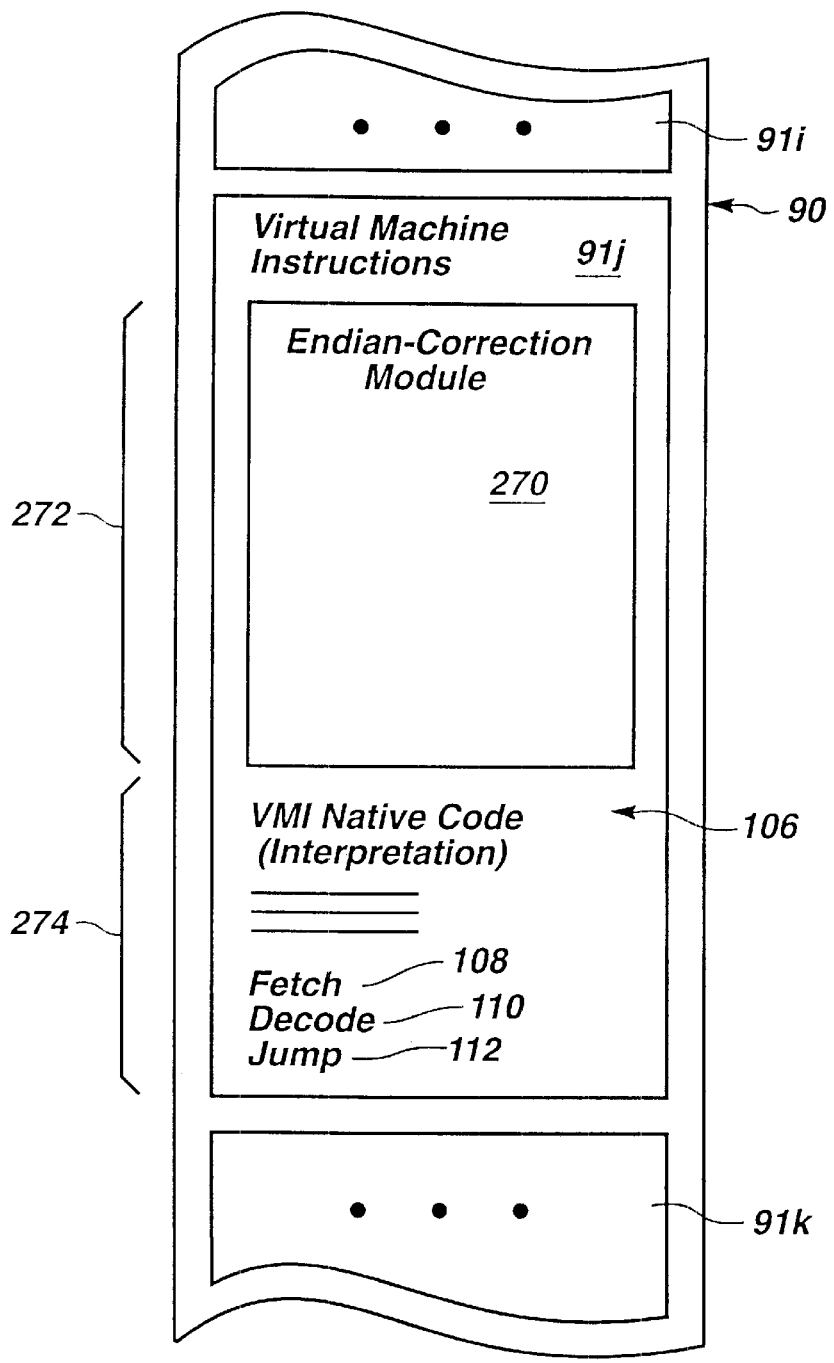
FIG. 8 is a schematic block diagram of processes programmed into a virtual machine instruction for handling endian-antithetical operands.

Referring to FIG. 8, a virtual machine instruction 91j, among several virtual machine instructions 91i, 91j, 91k of a virtual machine 90, is illustrated. The virtual machine native code 106 or interpretation 106 with its terminal fetch 108, decode 110, and jump 112 as illustrated in FIG. 3 is shown. The portion 274 of the virtual machine instruction 91j is executed in every case where a program 130, or rather an instruction 132 in a program 130, calls a virtual machine instruction 91. In an endian-neutral instruction 91, the substantive portion 294 may be the entire virtual machine instruction 91.

By contrast, an endian-specific instruction 262 requires the endian correction module 270 within the virtual machine instruction 91j. The portion 272 of the virtual machine instruction 91j is time-consuming manipulation of the improper endians 200, 210. Note that although the little endian 200 and big endian 210 identify the entire instructions lines 200, 210, respectively, the endians 200, 210 actually refer may be used to the address bytes 214 alone. Accordingly, an endian antithetical instruction 266 requires the additional processing step on an endian correction module 270.

Referring to FIG. 9, typical byte-ordering, run-time code 270 is illustrated for a virtual machine instruction 91 requiring 4-byte addressing 214 or operands 214. Referring to FIGS. 9–11 generally, a comparison may be made between the byte-ordering, run-time code for a virtual machine instruction 91 having 2-byte addresses or operands 214. FIGS. 9–10 refer to endian antithetical instructions 266. By contrast, FIG. 11 refers to endian-neutral, run-time code.

The endian correction 270 comprising opcodes 212 and addresses 214 in FIGS. 9–10 illustrate that a 16-bit or 2-byte address 214 requires five instructions to execute the endian correction 270. A 4-byte or 32-bit address 214 requires ten instructions. By contrast, an endian-neutral, run-time code example, corresponding to the endian-correction 270 and native code 106 of FIG. 8, requires a single instruction 276, 278.

To accomplish the same result as the endian correction 270 and code 106 of FIG. 9, a 32-bit endian-neutral, run-time code 278 requires a single instruction 278 in the example. Similarly, to accomplish the same result as the five instructions 212 of FIG. 10, a 16-bit endian-neutral, run-time code 276 requires a single instruction 276. The instructions 276, 278 are those that would be expected by an endian-neutral instruction 132 in which the endian-correction module 270 is not required. The typical codes 270, 280 illustrate the dramatic difference in processing time resulting from having to make endian-corrections 270. The codes of FIGS. 9–11 include both the endian-correction 270 and the substantive effect 106 of the instruction 91j or the example illustrated.

Referring to FIG. 12, the execution time 282 is illustrated for an endian-antithetical execution 266. The execution time 282 is dependent upon the number 284 of non-endian-sensitive opcodes 264 or endian-neutral opcodes 264 multiplied by the number of executions 106 required for each. Also, the execution time 282 is dependent upon the total number 288 of endian-sensitive opcodes 266, or actually the endian-antithetical opcode executions 266 that must be re-ordered.

The number 288 of re-ordered opcodes 266 executed is multiplied by a weight 290 reflecting the difference in the endian-correction module 270 and the individual endian-neutral codes 276, 278 that would be required. The weight 286 is unity, reflecting the appropriate run-time code 276, 278 for a 16-bit or a 32-bit endian 198, 214, respectively. By contrast, the weight 290 corresponds to the five-fold or ten-fold increase in the number of instructions 106 required to accommodate the endian-correction module 270 as well as the substantive instruction (opcode 218) constituting the substantive portion 274 of the virtual machine instruction 91.

The processing time 292 indicates the amount of processor time, usually measured in terms of clock cycles, required by the processor 12 to execute each opcode 212. Thus, the number 284 of endian-neutral executions 268, multiplied by a weight 286 corresponding to a clock-cycle count of unity (regardless of whether one or two clock cycles is required for each instruction, one may think of this as a base-line execution) added to the number 288 of re-ordered opcodes 212 to be executed, multiplied by their respective weights 290, form a multiplicand for the processing time 292. This product indicates the number of clock cycles required for executing a singe instruction 212, 198.

The ratio 294 of endian-neutral executions 268 to the number 288 of endian-antithetical executions 266 is typically one. That is, N 284 is the same as M 288. Meanwhile, the individual weight 296 for a 16-bit, endian-antithetical execution 266 has a value of about 5. Likewise, the weight 298 corresponding to a 32-bit, endian-antithetical 266 has a value of about 10, as illustrated in FIGS. 10, 9, respectively.

The weight 290 corresponding to an endian-sensitive execution 266, when executed on a processor 12 oriented with the proper endian 198, becomes the same as the weight 286 for endian-neutral executions 268. In such a case one may think of the number 288 being added into the number 284, or the number 288 equaling the number 284, with the weight 290 equaling the weight 286. The effect of an apparatus and method in accordance with the invention, implementing endian-neutral instructions 276, 278 in lieu of the endian-antithetical executions 266 is to render a weight 290 effectively equal to the weight 286 of unity for endian-insensitive executions 268.

Figure 13:
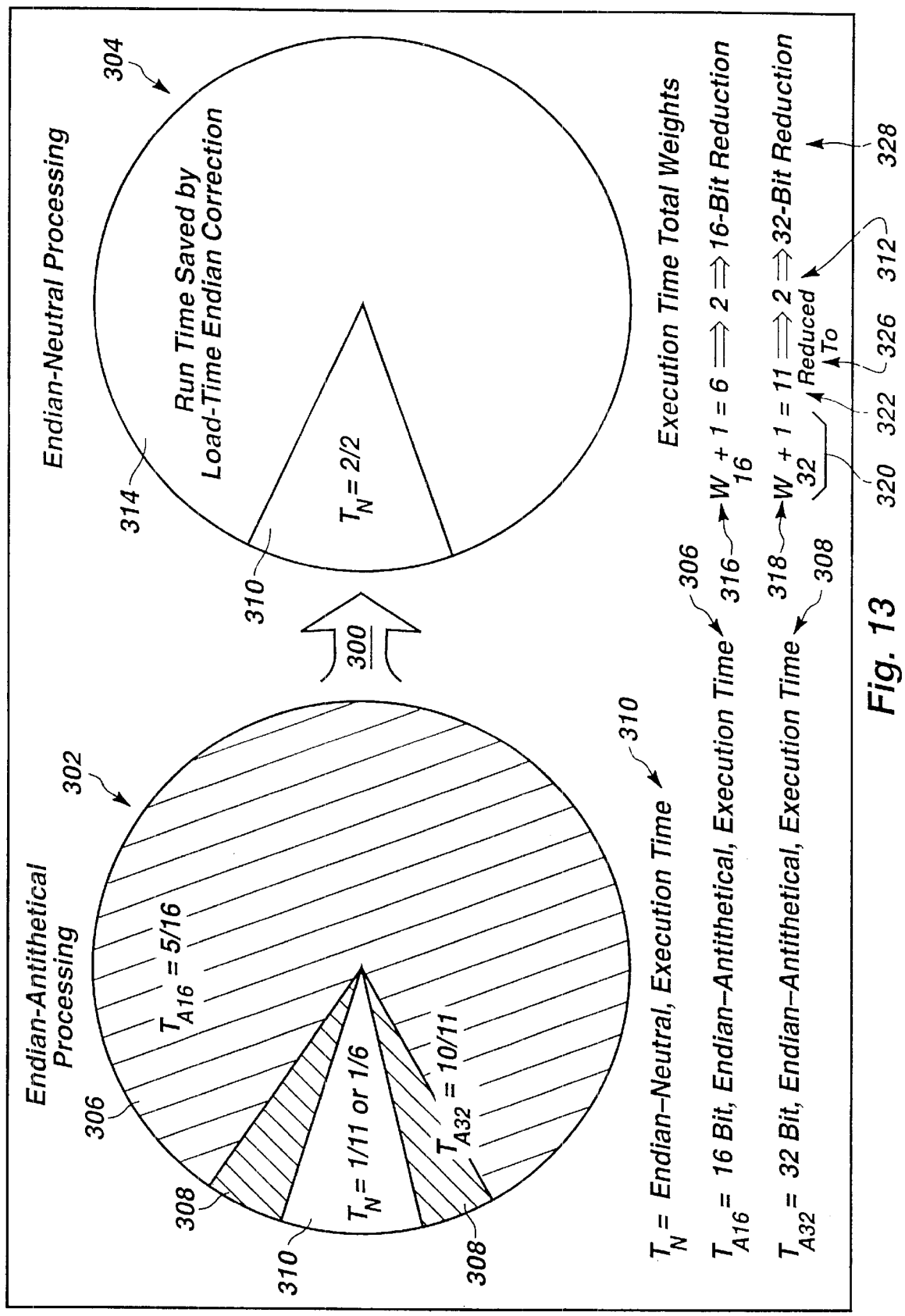

Referring to FIG. 13, the result of the execution time 282 of FIG. 12 is illustrated. In one embodiment of an apparatus and method in accordance with the invention, and endian-corrected loading 300 is performed by the loader 129. The endian-corrected loading 300 effectively re-orders the bytes 228–336 or bytes 238–246 at load time. The loader 129 loading the virtual machine instructions 132 of the program 130 makes a determination regarding the endian orientation of each of the instructions 198 and the orientation of the processor 12. At loading, the loader 129 re-orients or re-orders the addresses 214 or operands 214 associated with endian-sensitive opcodes 266. Thus, all endian-sensitive opcodes 262 may be executed as endian-insensitive executions 268.

The endian-antithetical processing time 302 is contrasted with the fully endian-neutral, processing time 304. For example, in FIG. 13, the endian-antithetical processing 302 includes time 306 associated with endian-antithetical executions 266 of 16-bit operands 214. The time 306 required, of the total processing time 302 is ⅚ of the total processing time 302. This reflects the number of instructions 212 required in FIG. 10. The time 308, 310, together, totals the remaining endian-neutral processing executions 268.

The time 308, in combination with the time 306 reflects the total endian-antithetical processing executions 266 for a 32-bit operand 214. Note that the total processing time 302 for endian-antithetical processing 302 is actually considerably greater, and is illustrated here by way of a ratio, for a 32-bit execution time 308. The execution time 308 may be thought of as pertaining to the endian-neutral processing time 310 for the 16-bit case, and the time 308 may be seen as encompassing all of the time fraction 306 in a 32-bit case. Thus, the endian-antithetical processing time 302 reflects the equation for execution time 282 of FIG. 12.

The time 306 is very disproportionate to the time 310, even thought the number 284 corresponding to the time 310 is the same as the number 288 corresponding to the time 306. The difference, is that the weight 286 corresponding to the time 310 is considerably less than the weight 290 associated with the processing time 306.

Similarly, for 32-bit case, the weight 290 is even more disproportionate to the weight 286, although the number 284 is the same as the number 288 in this case as well. As a practical matter, the weight 290 actually reflects the individual executions 106 within the processor 12, rather than the number of instructions reflected by the numbers 284, 288. The time 314 represents the portion 314 of the time 302 that is saved by the endian-corrected loading 300.

Thus, the endian-neutral processing time 304 actually includes only the endian-neutral time 310. The execution time saved 314 represents a reduction of the weight 290 of FIG. 12 to a value of 1, thus, the endian-neutral processing time of the endian-neutral processing arrangement 304 is double the endian-neutral processing time 310 of the endian-antithetical processing time 302.

The total weight 316 corresponding to endian-antithetical processing 302 for a 16-bit address 314, and the total, execution-time weight 318 for 32-bit addresses 214 are accommodated in total weights 320. The value 322 of the weights 316, 318 are 6 and 11 respectively, as illustrated in FIGS. 7–13. A reduction 323 for each of the 69-bit and 32-bit cases is illustrated. Approximately half of the executions 261 occupying approximately 83 or 91 percent of the processing 302 are reduced to the same endian-neutral time 310 as the endian-insensitive instructions 268. The resulting total weights 316, 318 of 2 and 2, respectively, rather than values of total weights 316, 318 of 6 and 11, respectively. The results of the reductions 323 in the total weights 320 can approximately triple or quintuple the speed at which instructions 132 are processed by the processor 12.

Figure 14:
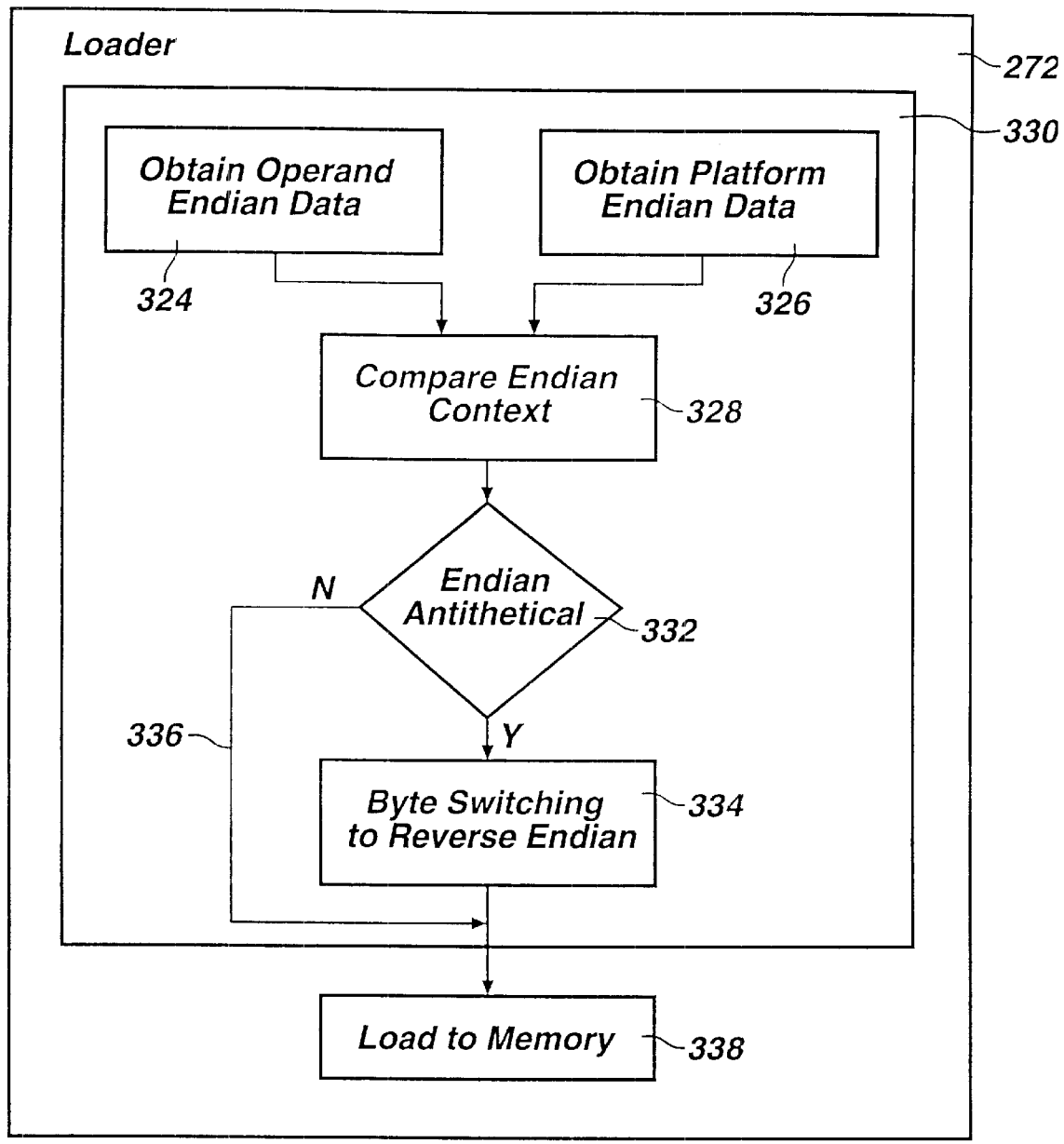
FIG. 14 is a schematic block diagram of an endian-correction process in a loader.
Figure 15:
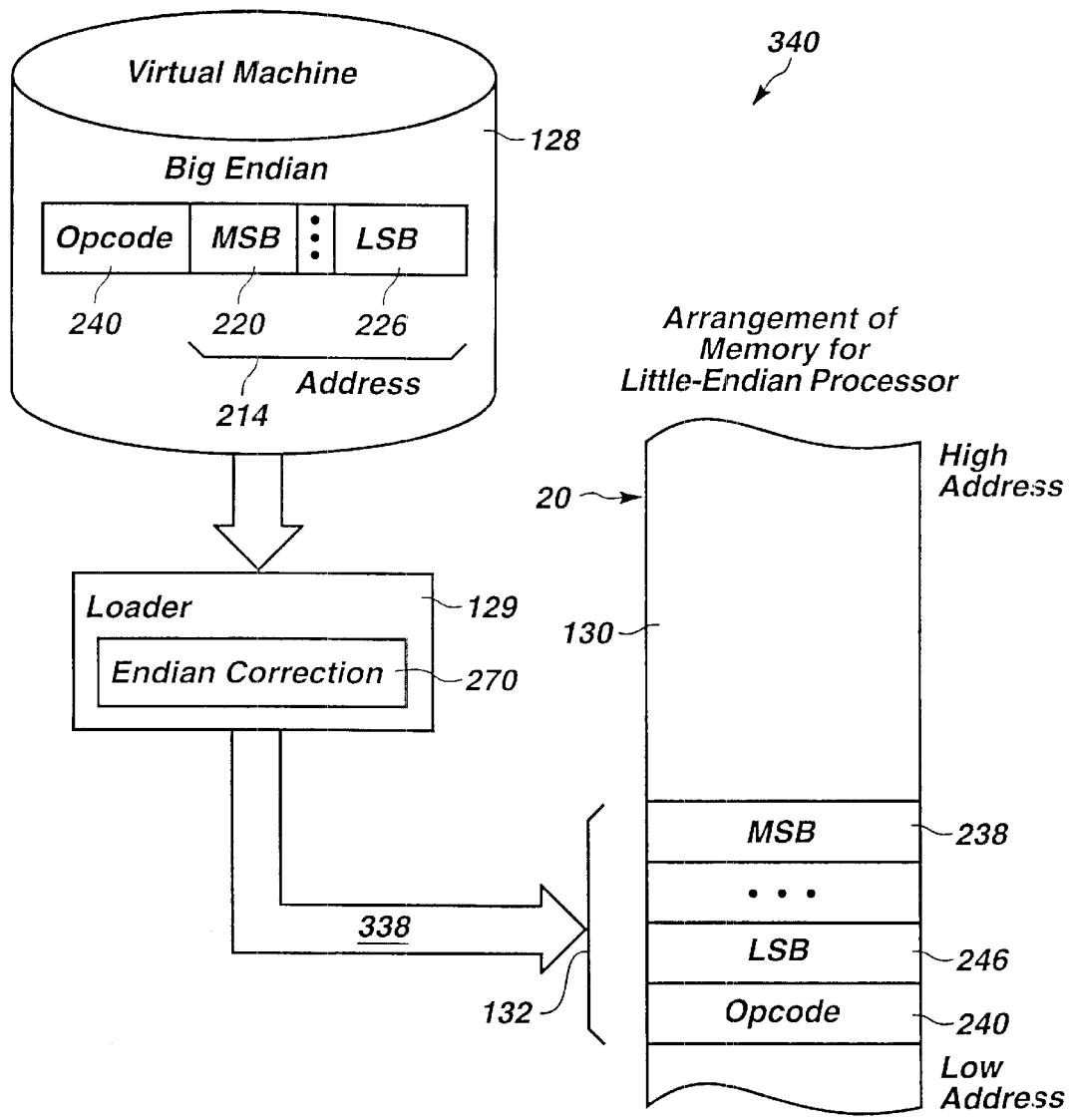
FIGS. 15–18 are schematic block diagrams of stored data structures and the loader adapted to effect endian-neutral correction of addressed associated with opcodes.

Referring to FIG. 14, a loader 129, implements a load-time correction 330 of operands 214 replacing the endian-correction module 270 of FIG. 8. In FIG. 14, a loader 129 may obtain 324 operand endian data indicating the ordering of operands 214. Similarly, the loader 129 may be provided, or otherwise obtain 324, platform-endian data corresponding to the orientation of the processor 12 and the execution for ordering of endians 198. The loader 129 may compare 328 the endian contexts of the endian data 324, 326 corresponding to the operands 214, and the processor 12, respectively.

Not all opcodes 212 are endian-sensitive 264. A test 332 may determine whether a particular opcode 212 is endian antithetical 332. To the extent, that an opcode 212 is endian-insensitive 264, resulting in an endian-neutral execution 268, the operand 214 is irrelevant. If a positive response to the test 332 occurs, then a byte-switching step 334 may reverse the order of the respective address 214 of the offensive endian 198. The loader 129 thus reorients or re-orders those addresses 214 in endians 198 that would result in endian-antithetical executions 266.

To the extent that the test 332 returns a negative response, the loader 229 may bypass 336 the byte-switching step 334. That is, if an operand 214 is endian-insensitive 264, resulting in endian-neutral execution 268, no point is served by considering the operand 214. To the extent that an opcode 218 contains no operand 214, no processing is required of the loader 129 to manipulate absent operands 214.

The endian correction module 330 in the loader 129 performs the function in lieu of the endian-correction module 270 in a virtual machine instruction 91 herein. Otherwise, the virtual machine instruction 91 must execute the endian-correction module 270 for every single endian-sensitive opcode 266 that may occur during processing 261. The disproportionate number 266 of calls to the endian-sensitive opcodes 262 churn the code of virtual machine instructions 91 through the processor 12 in such a case. In an apparatus and method in accordance with the invention, the byte-switching 334 in response to the comparison 328 change the endian-orientation 200, 210 of the static code distribution 260, rendering the endian-sensitive opcodes 262 endian-insensitive 264. All executions 261 are then endian-neutral executions 268. Alternatively, one may think of the endian-antithetical executions 266 as being rendered to have a weight 290 having a value of unity.

Having re-ordered the endians 198 as needed, the loader 129 may then proceed to load 338 into the memory 20 the opcode 212 and associated operand 214. Thereafter, no virtual machine instruction 91 need use an endian-correction module 270. Instead, an endian-correction module 330 executed by a loader 129, at one time solved the problem for every execution of each endian-sensitive opcode 262. That one time is at load time only.

Referring to FIGS. 15–18, endian-neutral loading 340 is illustrated in various configurations. For example, in FIG. 15, a virtual machine 128 that is operating for native big-endians 240 is destined for execution according to a program 130 in memory 20 that is oriented for little endians 200. Accordingly, the memory 20 must receive the opcode 240 followed by the least significant byte 246 and ranging to the most significant byte 238, beginning at a low value of the memory 20. The most significant byte 220 in the operand 214, down to the least significant byte 226 are improperly ordered. Accordingly, the loader 129 may invoke an endian-correction module 330 followed by a load 338 into memory 20 eliminating the problem.

Figure 16:
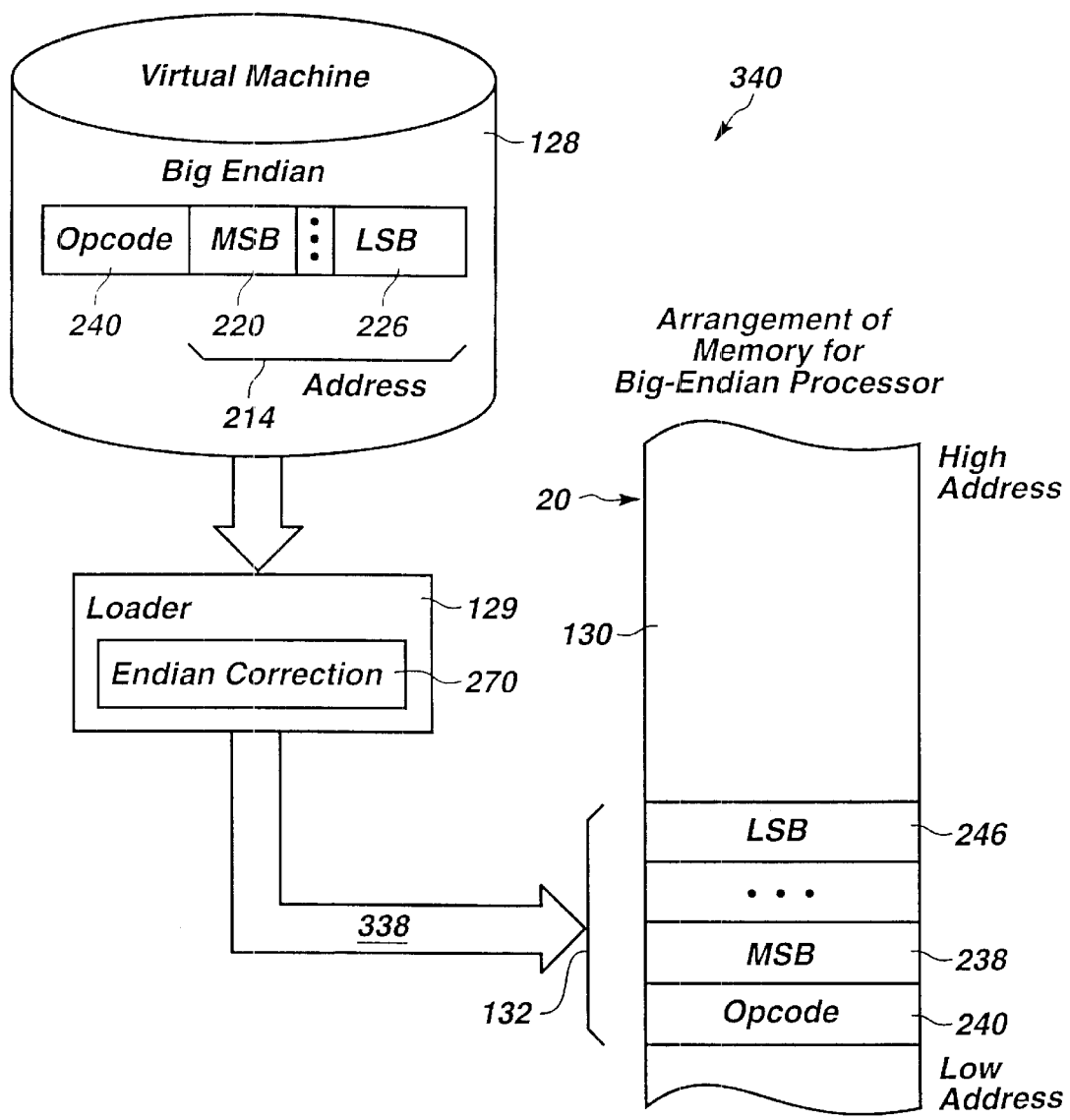

Referring to FIG. 16, a virtual machine 128 is oriented for a big endian 210 in which an opcode 240 has an address 214 with the most significant byte 220, first consistent with the requirements of the instruction 132 in memory 20. Accordingly, the program 130 requires no correction by the endian-correction module 330. Instead, the test 332 in the engine correction module 330 of the loader 129 will bypass 336 any correction of the operands 214.

Figure 17:
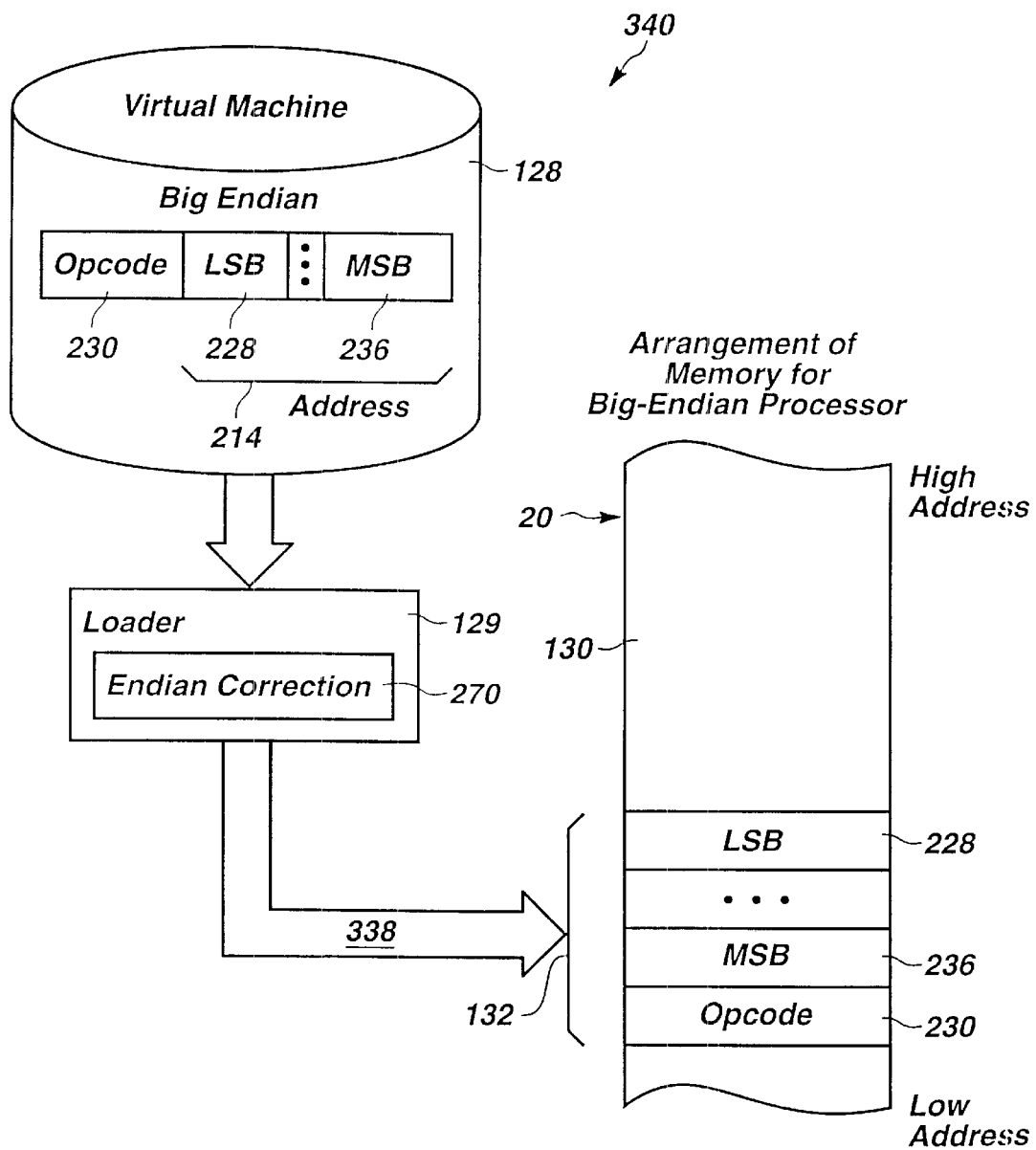

Referring to FIG. 17, a virtual machine 128 is oriented for a little endian 200, while the arrangement of the memory 20 for the program 130 is expecting a big endian 210. Accordingly, the instruction 132 in memory 20 must be oppositely oriented, from the address 214 of the virtual machine 128. Accordingly, the endian correction module of the loader 129 performs byte-switching 334 on the address 214. Thus, the opcode 230 is first, followed by the most significant byte 236 and subsequent bytes 234, 232 down to a least significant byte 228. The program 130 is then loaded by the loader 129 in a load step 338 into the memory 20. Accordingly, when the instruction 132 is read as data out of memory 20 and has applied to it the vertical machine instructions 91 in the processor 12, no endian-correction module 270 is required in any virtual machine instruction 91.

Figure 18:
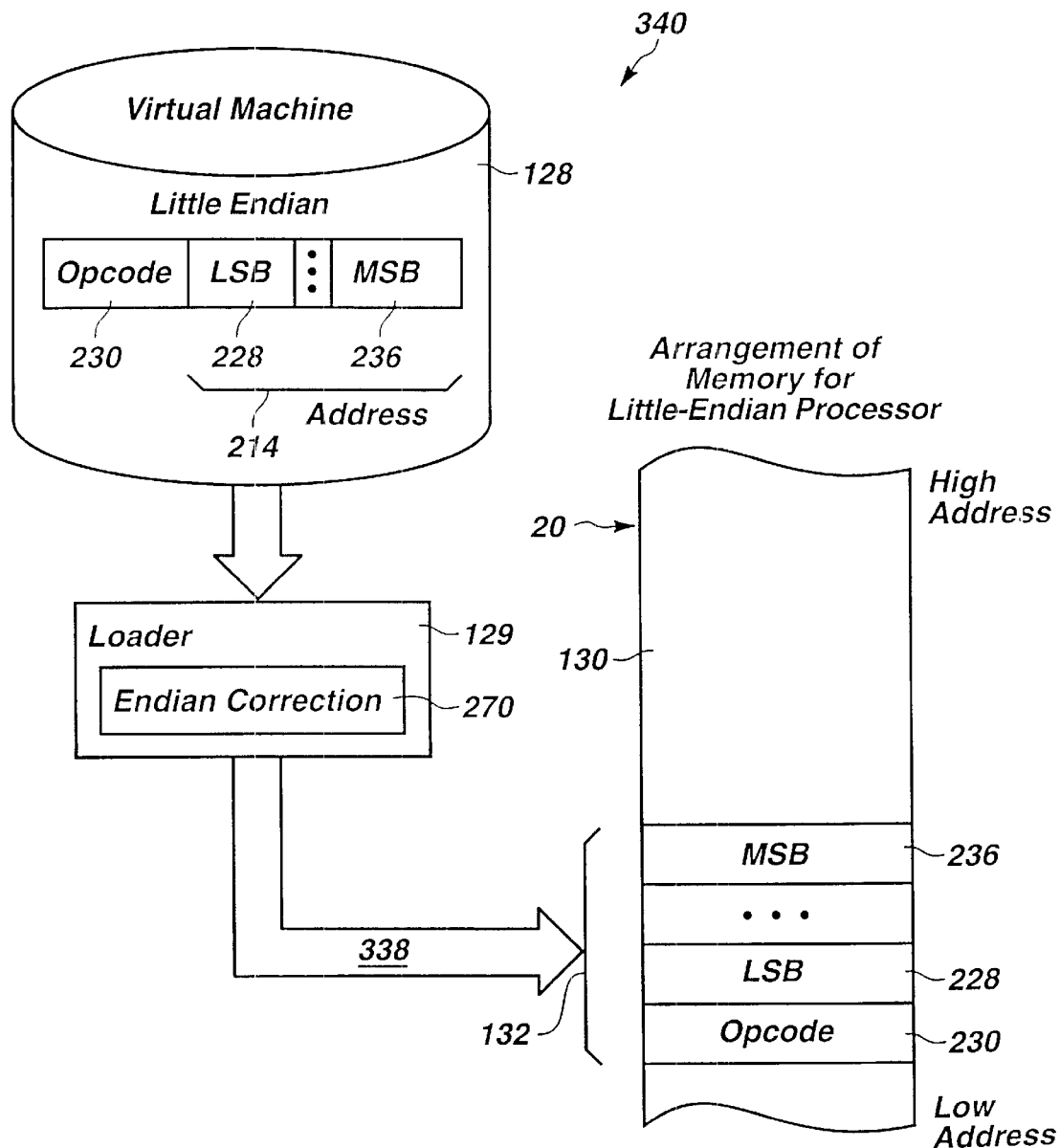

Referring to FIG. 18, the virtual machine 128 of FIG. 17 is illustrated with the least significant byte 328 first, following the opcode 230. The address 214 is thus ordered precisely as required by the instruction 132 in the program 130 stored in memory 20. Since the opcode 230 is already followed by the least significant byte 228 up to the most significant byte 236, as required, ranging from a low value to a high value of the memory 20, the endian-correction module 330 executes a bypass 336. That is, the test 332 indicates that the endian data obtained 324 and corresponding to the instruction 212 in the virtual machine 128, when compared 328, to the data obtained 328 to correspond to the processor 12, results in a negative response to the test 332 and bypass 336 in the endian-correction module 330 of the loader 129.

One may see that all processing becomes endian-neutral 268. All executions 261 become endian-neutral executions 268, with inordinate wasted time 314 becoming saved time 314 in the endian-neutral processing 304, in accordance with the invention. This contrasts to the endian-antithetical processing 302, wherein approximately 60 to 80 percent of the execution time 282 may be wasted. Churning instructions 130, 198 through the byte-ordering, run-time codes 270, is replaced by the endian-neutral run-time codes 280 of the examples of FIGS. 8–11. Thus, the endian-correction module 270 in each virtual machine instruction 91, so effective, is obviated and may be eliminated by the endian-correction module 330 in a loader 129.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for programmatically managing endian formats of byte code operands, the apparatus comprising:
    a memory device operably connected to the processor and containing executables comprised of instructions, wherein the executables in the memory device comprise a virtual machine containing opcodes and addresses, the addresses being arranged antithetically to the endian ordering native to the processor;
    an endian-correction module effective to render endian-sensitive opcodes endian-insensitive at the time of loading the opcodes into the memory device, such that the endian-insensitive opcodes can be repeatedly executed as needed without having to be re-corrected.

2. A memory device comprising data structures storing executables for executing by a processor operably connected to the memory device and a processor cache, the data structures comprising:
    a loader;
    an interpreter;
    a program; and
    the loader comprising an executable effective to correct at the time of loading the program endians of program instructions that are antithetical to the interpreter such that the corrected program instructions can be repeatedly executed as needed without having to be re-corrected for endians.

3. The memory device of claim 2, wherein the program further comprises: a virtual machine application, executable by the processor in conjunction with virtual machine instructions.

4. The memory device of claim 3, wherein the loader further comprises a test effective to determine whether the virtual machine application is interpretive and endian antithetical.

5. The memory device of claim 3 wherein the loader further comprises an instruction effective to obtain the operand-endian data platform-endian data corresponding to normal operation for endian-neutral processing of virtual machine instructions by the processor.

6. The memory device of claim 2, wherein the loader further comprises a reordering executable instruction, executable at load time by the processor, and effective to render endian-antithetical instructions endian-neutral with respect to the processor.

7. The memory device of claim 2, wherein the data structures further comprise an interpretive environment comprising a set of instructions executable to implement the interpretive environment in an endian-neutral manner with respect to the processor.

8. The memory device of claim 7, wherein the data structures further comprise an executable effective to re-order bytes in an operand associated with an opcode, in order to load as endian-neutral the instructions, upon execution of the loader.

9. The memory device of claim 8 wherein the loader further comprises a byte-switching executable effective to control the processor to re-order an endian antithetical operand without changing the effective contents thereof, leaving the memory device otherwise functional to provide an opcode and switched contents corresponding, to the contents re-ordered to the processor, for execution with comparatively fewer machine-level instruments.

10. A method for managing endian compatibility of an interpreter and a processor associated with a computer having operably connected a processor and a memory device, the method comprising:
    providing an operating system effective to execute the interpreter on the processor;
    providing a loader, wherein the loader obtains endian identifying data, and tests an instruction corresponding to the interpreter; and executes a byte-switching module to selectively control the endian correspondence of the interpreter instruction consistent with the endian correspondence of the processor such that the corrected interpreter instruction can be repeatedly executed as needed without having to be re-corrected.

11. The method of claim 10, wherein executing the loader further comprises obtaining operand endian data corresponding to an operand of the instruction and endian data corresponding to the processor cache.

12. The method of claim 10, further comprising comparing operand data and processor endian data to control selective byte-switching of the contents of the operand.

13. The method of claim 12, wherein loading further comprises selectively reversing the operand endian.

14. The method of claim 12, wherein the contents further comprise a 16-bit address.

15. The method of claim 12, wherein the operand further comprises a 32-bit address.

16. A method for loading a set of instructions from a storage device to a memory device coupled wherein the memory device is coupled to a processor, the method comprising:
    (a) obtaining a platform endian context for endian data corresponding into the processor;
    (b) obtaining a operand endian context indicating the ordering of operands contained in the set of instructions;
    (c) reading an instruction in the set of instructions;
    (d) determining whether an operational code for the instruction is endian antithetical to the platform endian context, if yes, then rendering the endian-sensitive opcode endian-insensitive;
    (e) loading the instruction into an appropriate memory location within the memory device; and
    (f) repeating steps (c) through (e) for every instruction in the plurality of instructions until each instruction in the set of instructions has been loaded into the memory device, such that the endian-insensitive opcode can be repeatedly executed as needed without having to be re-corrected.

* * * * *